United States Patent [19]

Koshi et al.

[11] Patent Number: 5,414,527
[45] Date of Patent: May 9, 1995

[54] IMAGE ENCODING APPARATUS SENSITIVE TO TONE VARIATIONS

[75] Inventors: Yutaka Koshi; Koh Kamizawa; Setsu Kunitake; Kazuhiro Suzuki, all of Kanagawa, Japan

[73] Assignee: Fuji Xerox Co., Ltd., Tokyo, Japan

[21] Appl. No.: 928,718

[22] Filed: Aug. 13, 1992

Related U.S. Application Data

[63] Continuation-in-part of Ser. No. 748,502, Aug. 22, 1991, abandoned.

[30] Foreign Application Priority Data

Aug. 14, 1991 [JP] Japan ................................. 3-204436

[51] Int. Cl.⁶ .............................................. H04N 1/415
[52] U.S. Cl. ..................................... 358/433; 358/429; 348/420
[58] Field of Search ................... 358/261.3, 262.1, 426, 358/427, 429, 433, 138; 382/56; 348/420, 416

[56] References Cited

U.S. PATENT DOCUMENTS 5,036,391  7/1991  Auvray et al. ...................... 348/520
5,241,395  8/1993  Chen ................................. 358/433

Primary Examiner—Edward L. Coles, Sr.
Assistant Examiner—Kim Yen Vu
Attorney, Agent, or Firm—Finnegan, Henderson, Farabow, Garrett & Dunner

[57] ABSTRACT

An encoding system which prevents deterioration of a picture quality and provides a high encoding efficiency even when the size of a block is increased to enhance an encoding efficiency. An input image which is divided into blocks by a blocking unit, is supplied to a plurality of encoders which perform encoding in different numbers of tone levels respectively. Respective pieces of encoded image information from the respective encoders are supplied in common to a selector. A block classification unit determines the degree of the tone gradient of an input block and then outputs the classification result to the selector. The selector, in accordance with the block classification result, selects one of the respective pieces of the encoded image information and outputs the selected one as selected encoded image information. For example, when the tone varies greatly, there is selected the encoder which has a small number of tone levels and a high resolution.

13 Claims, 13 Drawing Sheets

DUAL-TONE LEVEL QUANTIZATION

FOUR-TONE LEVELS QUANTIZATION

16-TONE LEVELS QUANTIZATION

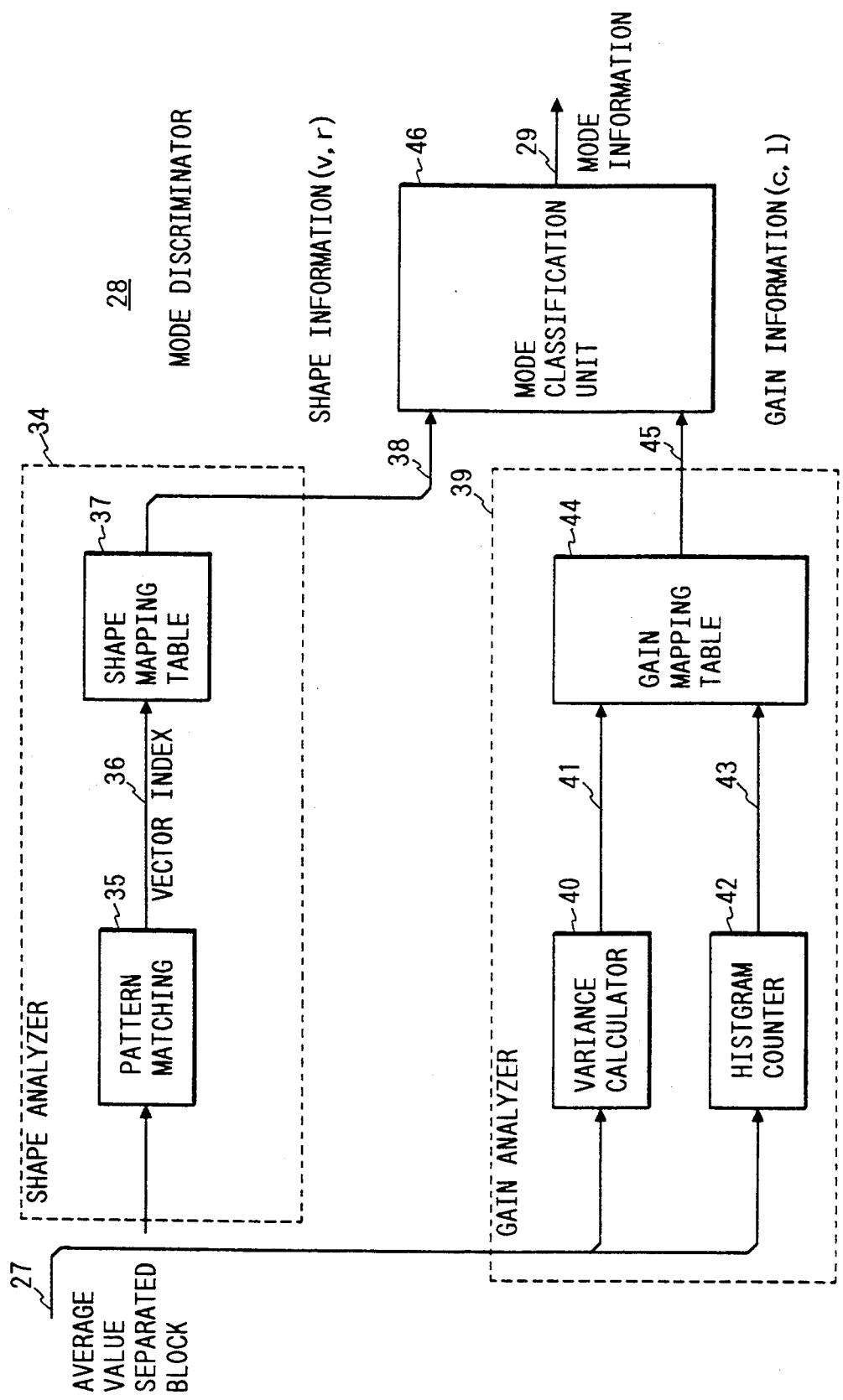

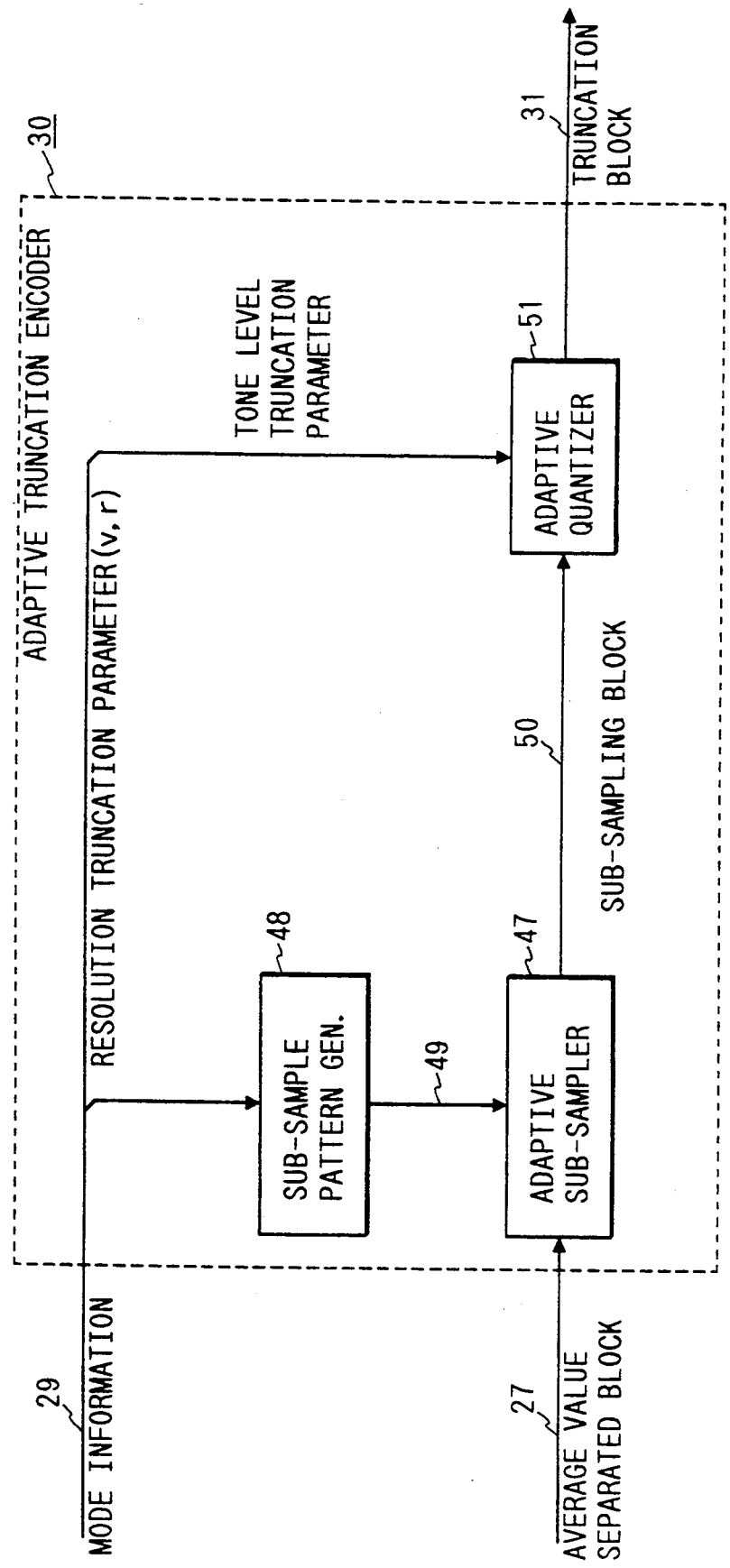

FIG. 16
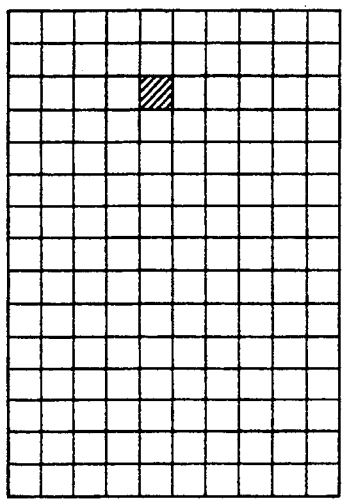
FIG. 17
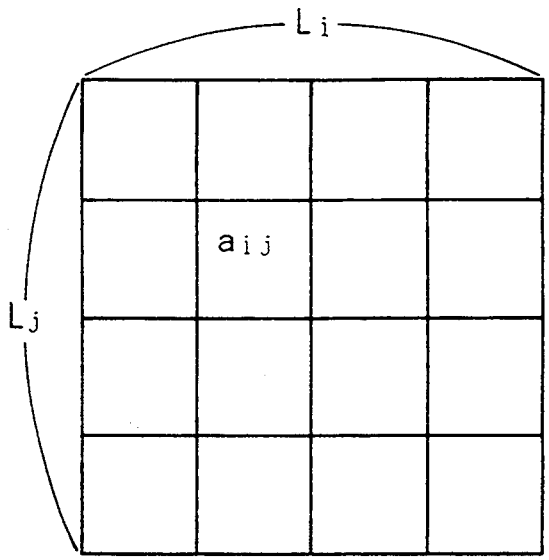
FIG. 18
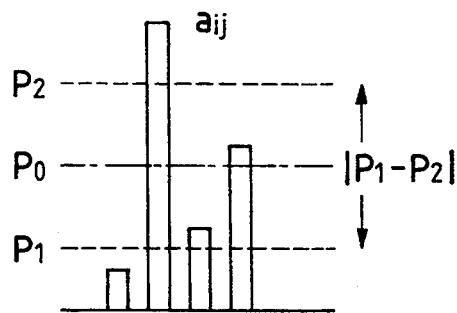
FIG. 19
| $P_0$ | $P_0$ | $P_0$ | $P_0$ |
|---|---|---|---|
| $P_0$ | $P_0$ | $P_0$ | $P_0$ |
| $P_0$ | $P_0$ | $P_0$ | $P_0$ |
| $P_0$ | $P_0$ | $P_0$ | $P_0$ |
FIG. 20
| $P_1$ | $P_2$ | $P_1$ | $P_2$ |
|---|---|---|---|
| .... | .... | .... | .... |
| .... | .... | .... | .... |
| .... | .... | .... | .... |

IMAGE ENCODING APPARATUS SENSITIVE TO TONE VARIATIONS

BACKGROUND OF THE INVENTION

This application is a Continuation-in-Part of U.S. patent application Ser. No. 07/748,502, filed Aug. 22, 1991, is now abandoned, the disclosure of which is incorporated herein by reference.

FIELD OF THE INVENTION

The present invention relates to a half-tone or continuous tone image encoding device.

DESCRIPTION OF THE BACKGROUND ART

In a facsimile terminal, for instance, an image to be transmitted or an image received is stored in a page memory. Also, in an image editing device, an image to be edited or an image edited is similarly stored in a page memory. The required capacity of the page memory is increased as the size of the image is increased and also as the resolution of the image is enhanced. Further, when a color image is to be stored, there is required a capacity three times larger than in the case of a monochromatic image. For example, when a full four-color image of A3 size is stored at a resolution of 400 dpi (dot/inch), a memory capacity reaches as great as 128M byte. If the memory capacity increases like this, not only the cost of the page memory increases but also it takes much time to read and write image data, leading to an extended process time.

As a solution of such problems, it has been examined that an image signal is encoded highly efficiently in such a form that the image signal can be edited while it remains encoded data. Such encoding requires the following three characteristics.

Firstly, compressibility must be uniform. That is, because the page memory is constructed such that it has a limited capacity, it is necessary to be able to encode the images at a preset compressibility independent of the images. Secondly, it is necessary that the encoded data can be edited as they are. That is, in order to be able to obtain the two-dimensional position of the image signal directly from the encoded data, it is necessary that the image signal divided in a given unit can be encoded in a given amount of codes and also that encoding/decoding can be achieved independently in every given unit. Thirdly, it is necessary that an encoding/decoding processing can be performed uniformly. That is, since the image is encoded on the page memory, it is necessary that the image can be encoded and decoded at a high and constant speed.

In a conventional image encoding device for storage and transmission, it is necessary to restrict the spacial/frequency redundancy of the image signal as much as possible and, therefore the compressibility varies according to the variations of the redundancy of the respective image signals. Also, there has been shown a tendency to introduce a higher level of encoding processing, which makes it difficult to execute the encoding/decoding processing independently in every given image division unit. Further, due to introduction of an adaptive processing, a quantity of operation necessary for the encoding/decoding processing varies greatly according to the variations of redundancy in each of the image signals. For these and other reasons, with such a conventional image encoding device, it is difficult to satisfy the above-mentioned characteristics.

An example of such efficient encoding methods has been proposed as a so-called BTC (Block Truncation Coding) scheme in Published Unexamined Japanese Patent Application No. Sho-57-174984, in which image signals are divided into block units each of a certain size and the shapes of every block is to be truncated.

The outline of the BTC scheme will be described with reference to FIGS. 16 and 17. In this scheme, an image as shown in FIG. 16 is divided into a plurality of block units each being composed of $L_i \times L_j$ picture elements as shown in FIG. 17. Assuming that $L = L_i = L_j$ and tone of the picture elements in a block are respectively expressed as $a_{ij}$, then the average tone $P_0$ of the whole of the block is $P_0 = \Sigma a_{ij}/L^2$. As shown in FIG. 18, if the average tone and the number of picture elements respectively having lower tone than the average tone $P_0$ in the block are $P_1$ and $N_1$, respectively, then the average tone $P_1$ and the number $N_1$ are expressed by:

$$P_1 = \Sigma\Sigma\, a_{ij}/N_1,\ N_1 = \Sigma\Phi_{ji}$$
$$a_{ij} \leq P_0$$
$i$ and $j$ range from 1 to $L$.

If the average tone and the number of picture elements respectively having higher density than the average tone $P_0$ in the block are $P_2$ and the number $N_2$ are expressed by:

$$P_2 = \Sigma\Sigma\, a_{ij}/N_2,\ N_2 = \Sigma\Phi_{ji}$$
$$a_{ij} \leq P_0$$
and $i$ and $j$ range from 1 to $L$.

These expressions are established under the condition of $\Phi_{ij} = 0$ if $a_{ij} \leq P_0$, and $\Phi_{ij} = 1$ if $a_{ij} > P_0$.

Now, in case of inserting integers m and n smaller than $L^2$ and the number of tone levels of tone, it is discriminated as the tone distribution density in the block being uniform that $|P_1 - P_2| < m$, or $N_1 < n$, or $N_2 < n$. Thus, $\phi_{ij}$ are all considered as 0. As shown in FIG. 19, the whole blocks are represented only by the densities $P_0$. Also, when $|P_1 - P_2| \geq m$ and $N_1 \geq n$ and $N_2 \geq n$, then the tone distribution density in the block is considered as being not uniform and, as shown in FIG. 20, the blocks are represented by both average tone $P_1$ and $P_2$. In this case, $P_1$ is positioned where $\phi_{ij}$ is 0, and $P_2$ is positioned where $\phi_{ij}$ is 1, correspondingly. $\phi_{ij}$ represents the information related to the shape of the block, referred to as resolution information, while $P_0$ or $P_1$, $P_2$ represent the information which indicate the tone levels, referred to as gradation information. When encoding the resolution information, the resolution information is encoded every several pair of lines by an ordinary binary coding scheme, and the successive length of blocks equal to each other in the information values is also encoded by a well known run length scheme to be transmitted. Referring to the parameters m, n employed in this encoding method, m serves also as a discrimination of threshold to eliminate an isolated noise of the image and n serves also as a discrimination of threshold to eliminate the slight fluctuations of tone in the blocks, so that the image is to be smoothed so much as both the parameters m, n have larger values.

In this scheme, however, since picture elements in a block can be expressed only by two specified tone levels at maximum, there has been a issue that if block size L is made larger to obtain more high compression, the image tone levels becomes large, and particularly the distortion is not negligible in the area having a smooth tone gradation. In addition there is much redundancy, since the resolution information allocated uniformly to all blocks. Although in order to address this issue, it has been tried to reduce the redundancy by means of the binary coding of the resolution information every several lines, it has not been satisfactory.

In addition, there has been a problem that it is difficult to control the coding rate by selecting the parameters m and n, and it is also difficult to edit an image as it is in an encoded form.

SUMMARY OF THE INVENTION

In order to eliminate the foregoing problems accompanying the conventional one, the present invention has been accomplished, and an object of the invention is to provide a coding scheme in which performed is such expansion that blocks can be expressed by using a plurality of different numbers of tone levels in accordance with the contents of an image, and only required resolution information corresponding to the used number of tone levels is transmitted preserving image quality is minimized even in the case where the block size L is enlarged for more compression ratio, and the coding efficiency is made larger because redundant resolution information is not to be transmitted.

Also, it is another object of the invention to provide an encoding method in which, each time an input image signal is divided into block units, the shape/gain of the input image signal are analyzed by feature amount analyzing means to decide an encoding mode and block truncation encoding is adaptively executed by block truncation encoding means (which is disposed downstream of the analyzing means) in accordance with the decided encoding mode, whereby there is eliminated the need to previously decide the encoding mode and thus the combinations of the encoding modes can be changed freely.

In order to attain the above objects, according to the invention, there is provided an image encoding device which comprises blocking means for sampling an image and dividing the image into input blocks each consisting of a plurality of picture elements, namely, m×n picture elements (m, n are respectively an integer), block classifying means for classifying the tone levels and resolutions of the input blocks, and a plurality of block truncation encoding means respectively allocated in such a manner that the amount of codes of the tone levels and resolutions in the blocks provides a given amount of codes in each of the blocks, wherein the plurality of block truncation encoding means are adaptively switched in accordance with the results classified by the classifying means to thereby execute a block truncation encoding operation.

Also, according to another aspect of the invention, there is provided an image encoding device which comprises: blocking means for sampling an image and dividing the image into blocks each consisting of a plurality of picture elements, namely, m×n picture elements (m, n are respectively an integer); average value calculation means for finding an average value in the input blocks; average value separating means for subtracting the average value found by the average value calculating means from the respective picture elements in the input blocks; analyzing means for analyzing the feature amounts of the average value separated blocks in the resolution direction and in the gradation direction thereof found by the average value separating means; mode deciding means for deciding from the results of the analyzing means the picture element sub-sampling shape and picture element sub-sampling ratio in the plurality of average value separated blocks and the number of tone levels of the picture elements in the average value separated blocks independently of one another; resolution approximating means for sub-sampling the picture elements in the average value separated blocks in accordance with the picture element sub-sampling shape and picture element sub-sampling ratio decided by the mode deciding means; tone level approximating means for quantizing the picture elements in the average value separated blocks thinned out by the resolution approximating means by means of the number of tone levels decided by the mode deciding means; and multiplexing means for multiplexing the average value from the average value calculating means, the decision results of the mode deciding means, and the output of the tone level approximating means to thereby provide coded data.

According to the invention, for example, blocks are expanded in such a manner that the blocks can be expressed by use of a plurality of tone levels ranging from 1 or 2 tone levels up to an m number of tone levels (m is an integer equal to or larger than 2), and only necessary resolution information is transmitted in accordance with the number of tone levels used. Thanks to this, even when the size of the block for encoding is relatively increased in order to enhance an encoding efficiency, there is reduced the possibility that the image may be deteriorated in quality. Also, as generally known from Weber's law, according to a human visual characteristic, a slight difference is detected between tone levels in an image area where the density thereof has a smooth tone gradient, but such slight difference is hard to be detected between the tone levels in an image area where the tone thereof varies greatly. In view of this, according to the invention, in the image area having a smooth tone gradient, the number of tone levels is increased and at the same time the resolution is lowered. On the other hand, in the image area having a greatly varying tone, the number of tone levels is decreased and at the same time the resolution is enhanced. This makes it difficult for the image quality deterioration due to encoding to be detected visually and also can avoid the possibility that redundant tone level information and resolution information may be encoded, thereby improving an encoding efficiency.

Also, according to the invention, an image is sampled and the image is divided by blocking means into input blocks each of which consists of a plurality of picture elements, namely, m×n picture elements. Next, an average value in the divided input blocks is found by average value calculation means and at the same time the average value is subtracted from the respective picture elements in the input blocks by average value separating means and thus an average value separated block is obtained. After then, the feature amounts of the average value separated block in the resolution direction and tone level direction thereof are analyzed by analyzing means. In accordance with the analysis results, the sub-sampling shapes and ratios of a plurality of previously set picture elements as well as the number of tone levels of the picture elements are decided by mode deciding means. The picture elements in the average value separated block are thinned out in resolution approximating means in accordance with the picture element sub-sampling shapes and picture element sub-sampling ratios decided by the mode deciding means and after then the picture elements are quantized in tone level approximating means in accordance with the number of tone levels decided by the mode deciding means. The average value from the average value calculating means, the decision results of the mode deciding means, and the output of the tone level approximating means are multiplexed by multiplexing means to thereby provide coded data.

BRIEF DESCRIPTION OF THE DRAWINGS

In the accompanying drawings:

FIG. 9 is a block diagram of the details of a mode discriminator used in the embodiment shown in FIG. 8;

FIG. 10 is a block diagram of the details of the adaptive truncation encoder used in the embodiment shown in FIG. 8;

FIG. 16 is an explanatory diagram showing an image which is divided into a plurality of blocks;

FIG. 17 is an explanatory diagram showing the structure of a block;

FIG. 18 is an explanatory diagram of a tone which is used as a reference in encoding;

FIG. 19 is an explanatory diagram of a state of encoding when the tone of an image varies smoothly; and, FIG. 20 is an explanatory diagram of a stage of encoding when the tone of an image varies suddenly and greatly.

DESCRIPTION OF THE PREFERRED EMBODIMENTS

The present invention will be described in detail by way of the embodiments thereof with reference to the accompanying drawings.

Figure 1:
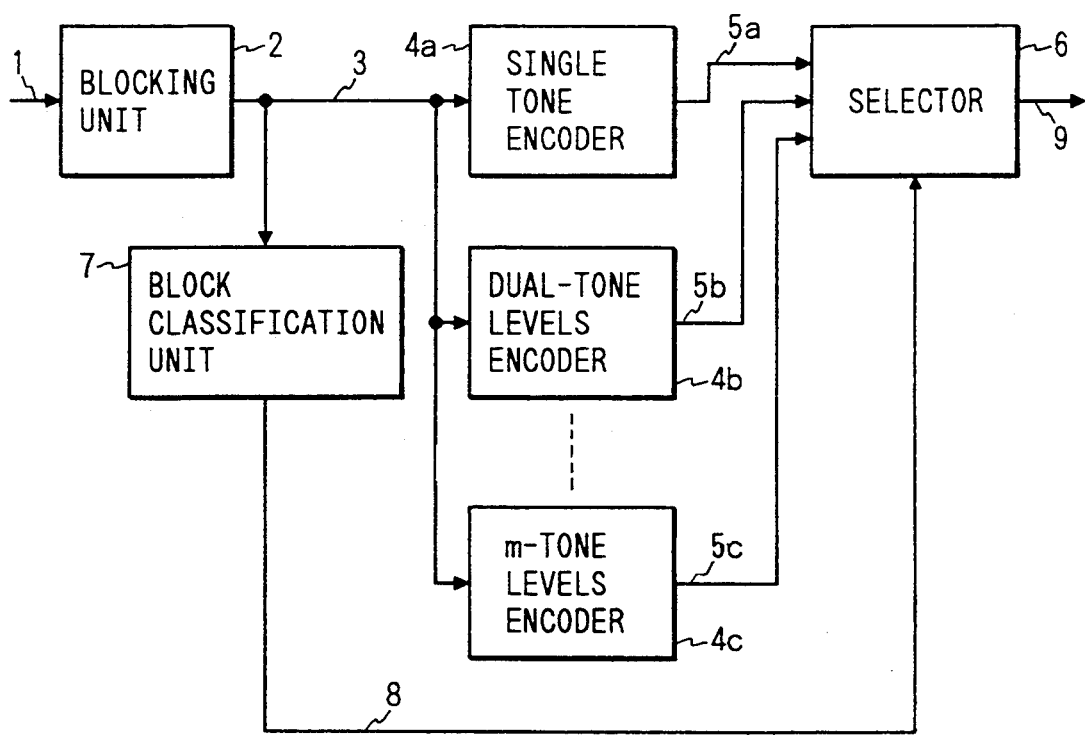
FIG. 1 is a block diagram of a structure of an embodiment of an image encoding device according to the invention.

In FIG. 1, there is shown a block diagram of the general structure of an image encoding device according to the invention.

At first, description will be given of the outline of the operation of an image encoding device according to the invention. Digitized image information (that is, input image) 1 to be encoded is divided by a blocking unit 2 into blocks each of which consists of m×n picture elements (m, n are respectively an integer which is 1 or more). The blocked pieces of the image information (input blocks) 3 are supplied to encoders 4a to 4c which execute encoding by means of a different number of tone levels respectively. In an embodiment shown in FIG. 1, the encoder 4a executes block truncation encoding with single tone level, the encoder 4b execute block truncation encoding with two tone levels, and the encoder 4c executes encoding with m tone levels. Three pieces of encoded image information 5a respectively from the encodes 4a to 4c are all supplied to a selector 6.

A block classification unit 7 classifies the blocks 3 for the degrees of the tone levels thereof and outputs the classification results 8 to the selector 6. In the present embodiment, the selector 8 selects the encoder 4a when the tone varies greatly whereas the selector 8 selects the encoder 4c when the tone shows a smooth gradient. As will be described later, with respect to the resolution information, encoding is executed in such a manner that the encoding is performed more frequently on the side of the encoder 4a which performs the block truncation encoding of single tone level and the encoding is performed less frequently on the side of the encoder 4c which performs the block truncation encoding of n tone levels. Therefore, when the tone varies greatly, the encoding is executed in such a condition that the tone level information is less and the resolution information is more. When the tone shows a smooth gradient, the encoding is executed in such a condition that the tone level information is more and the resolution information is less. The selector 6 selects one of the three pieces of encoded image information 5a to 5c respectively encoded by the encoders 4a to 4c in accordance with the block classification results 8 and then outputs the selected information as selected, encoded image information 9.

Next, description will be given in detail of the operation of the above-mentioned image encoding device.

In the present embodiment, it is assumed that the block size is 8×8 picture elements and the image information 3 shown in FIG. 1 is input in every block of 8×8 picture elements. Also, three kinds of tone levels including two tone levels, four tone levels and sixteen tone levels are to be block truncation encoded. However, this is not limited thereto, but the block size may be of other values and the block shape is not always limited to a square.

The block classification unit 7 shown in FIG. 1, as described before, classifies whether the tone of the picture elements in the blocks shows a smooth gradient, or a greatly varying gradient, or a distribution intermediate between the smooth and great gradients. In particular, the block classification unit 7 classifies the distribution of the tone of the picture elements in the blocks and, when the distribution is found great, the block classification unit 7 classifies that the tone varies greatly. Also, when the distribution is found small, it classifies that the tone has a smooth gradient. Further, when the distribution found intermediate between them, it classifies that the tone has an intermediate distribution. However, the invention is not always limited to the above-mentioned classification method but, for example, the tone of the picture element may be differentiated by a spatial axis and the number of the maximum values or minimum values may be used as a classification standard.

The respective encoders 4a to 4c are the same in the basic structure and, therefore, the three encoders will be described in common with reference to FIG. 2.

Figure 3A:
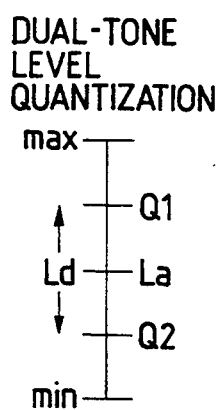
FIGS. 3(a), 3(b), 3(c) are explanatory diagram of quantization conditions in a plurality of encoders.
Figure 3B:
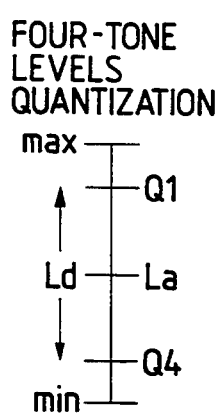
Figure 3C:
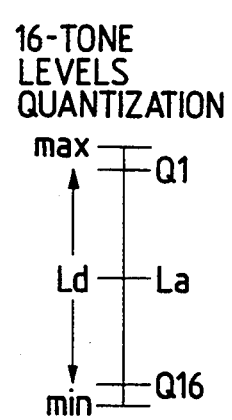

If the blocked image information 3 is input, then a quantization level controller 10 calculates a quantization level 11 from the image information 3 input thereto. The numbers and values of such quantization levels vary according to the respective encoders. For example, in the case of the encoder 4b which executes a dual-tone levels block truncation encoding operation, as shown in FIG. 3(a), it has two quantization levels which are designated by Q1 and Q2, respectively. Also, for the 4 tone levels and 16 tone levels, as shown in FIGS. 3(b) and 3(c) respectively, there are four quantization levels Q1 to Q4 (Q2, Q3 are not shown), and sixteen quantization levels Q1 to Q16 (Q2 to Q15 are not shown), respectively.

More concretely, as shown in FIG. 3, the maximum quantization level Q1 and the minimum quantization level Q2 or Q4 or Q16 are decided, and a distance between the maximum and minimum quantization levels are divided into equal distances and they are quantized linearly respectively. The maximum quantization level Q1 is set to be an average value of the tone values in the block, ranging from the picture element maximum tone value max down to the value of the tone of the n-th picture element. Similarly, the average value of the tone values ranging from the minimum tone value min up to the value of the n-th picture element is set as the minimum quantization level. Here, when the number of picture elements in the block is expressed as $L^2$ and the number of tone levels is expressed as 1, then the parameter n is a value of the order that is expressed approximately as $n=L^2/1$. However, a method of deciding the maximum quantization level and minimum quantization level is not limited to the above-mentioned method, but, for example, the maximum tone value max and the minimum tone value min in the block may be used as they are. Further, the invention is not always limited to the above-mentioned case in which the distance between the maximum and minimum quantization levels are linearly quantized into the equal distances, but, for example, non-linear quantization may be executed such as MAX's quantization (see Joel Max, "Quantizing for Minimum Distortion", IRE TRANSACTION ON INFORMATION THEORY, Mar. 1960, pp. 7–12). In other words, on the assumption of the probability tone function of the input image, there may be designed a quantizer which is best suitable for such probability tone function.

Next, a tone level information encoder 12 encodes the quantization level output from the above-mentioned quantization level controller 10. In particular, as shown in FIG. 3, the average value of the maximum quantization level Q1 and the minimum quantization level Q2, Q4 or Q16 is expressed as La and a difference between the maximum and minimum quantization levels is similarly expressed as Ld, and the average value and difference value are then output. In the present embodiment, if the image information 3 input has 256 tone levels per picture element and is expressed in 8 bits per picture element in terms of a binary expression with no code, then La and Ld respectively shown in FIG. 3 are expressed in the same number of tone levels or in a number of the order of the number of tone level and are thus expressed in a total of 16 bits or so. However, the method of encoding the quantization level 12 is not limited to this, but the maximum and minimum quantization levels may be allocated as they are. Also, when the non-linear quantization is executed by use of the above-mentioned quantization level controller 10, then it is necessary to encode the way of variation in quantizing steps (that is, a difference between mutually adjoining quantization levels).

Also, a quantizer 13 quantizes the above-mentioned input image information 3 in accordance with the quantization level 11 and then outputs the quantization result as resolution information 14. In this case, a threshold value of quantization is the average value of the corresponding quantization levels. For example, a threshold value between the quantization levels Q1 and Q2 is expressed as $(Q1+Q2)/2$. In the present embodiment, the image information is quantized into 2 tone levels, 4 tone levels or 16 tone levels and, accordingly, the quantized resolution information 14 provides information of 1 bit, 2 bits or 4 bits per picture element.

Figure 4A:
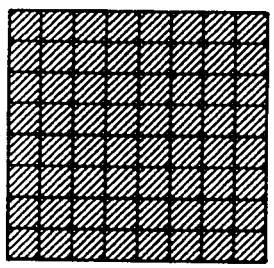
FIGS. 4(a), 4(b), 4(c) are explanatory diagrams of differences between the respective pieces of resolution information in the respective encoders.
Figure 4B:
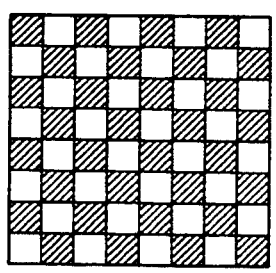
Figure 4C:
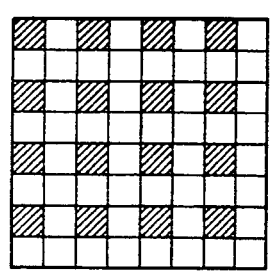

Next, a resolution information selector 15, in accordance with the number of tone levels quantized by the quantizer 13, removes visually redundant information from the resolution information 14, and outputs necessary resolution information 16. In the present embodiment, as shown in FIGS. 4(a), (b), (c), the selector 15 selects the resolution information on all of 64 picture elements (=8=8 picture elements) in the case of dual-tone levels encoding, selects the resolution information on 32 picture elements (=8×8 picture elements/2) in a zigzag checkered manner in the case of 4-tone levels encoding, and selects the resolution information on 16 picture elements (=8 picture elements/2×8 picture elements/2) in a perpendicularly checkered manner in the case of 16-tone level encoding. In FIG. 4, parts respectively shown by oblique lines show the picture elements that have been selected. However, the way of selection of the resolution information is not always limited to the above-mentioned one but, for example, in the case of the dual-tone level encoding, the resolution information on 32 picture elements may be selected in a zigzag checkered manner. Here, what is important is that, when more tone level information is allocated to a certain block, then the allocation of the resolution information is reduced, and, on the other hand, when less tone level information is allocated, then the allocation of the resolution is increased.

Next, a resolution information encoder 17 encodes the selected resolution information 16. In the present embodiment, there is not employed such encoding as can restrict the degree of redundancy in terms of information, but the selected resolution information 16 is expressed in a binary digit with no code as it is and three pieces of encoded image information 5a to 5c are output.

The selector 6, in accordance with above-mentioned block classification result, selects the three pieces of encoded image information 5a to 5c that are output from the encoders 4a to 4c respectively, and then outputs them.

The image information 3 input by every block is encoded in a combination of tone level information and resolution information to be output in the form of encoded image information 9.

In Table 1, there is shown a relationship between the tone level information and resolution information in the block truncation encoding of the respective tone levels.

TABLE 1

|  | Dual-Tone Levels Block Truncation Encoding | Four-Tone Levels Block Truncation Encoding | 16-Tone Levels Block Truncation Encoding |
|---|---|---|---|
| Quatization Level (Number of Bits) | $Q_1, Q_2$ (1 bit) | $Q_1$–$Q_4$ (2 bits) | $Q_1$–$Q_{16}$ (4 bits) |
| Tone level Information (Number of Bits) | La, Ld (8 bits × 2) | La, Ld (8 bits × 2) | La, Ld (8 bits × 2) |
| Resolution Information | 64 bits | 32 bits | 16 bits |
| Coding Amount | 8 × 2 = 1 x 64 = 80 bits | 8 × 2 + 2 x 32 = 80 bits | 8 × 2 + 4 x 16 = 80 bits |

As shown in Table 1, in the present embodiment, independent of the block classification results, a given piece of information (80 bits) is always allocated and encoded in each of the blocks. If the block select information of 2 bits is added every block in order to identify which encoder is selected in decoding, then an encoding efficiency or a compressibility in the present embodiment is 8×8 picture elements×8 bits/(80 bits+2 bits)=6.244.

Figure 2:
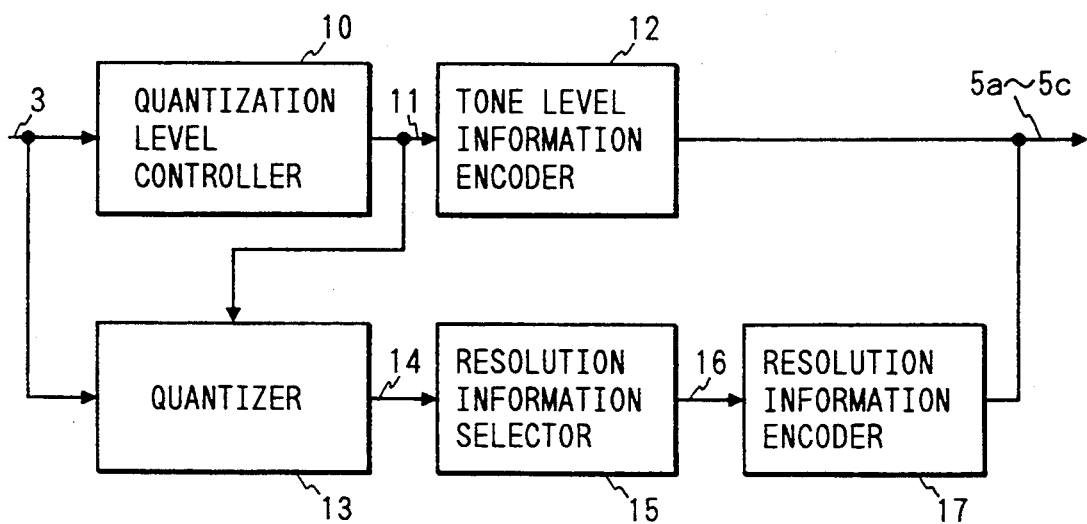
FIG. 2 is a block diagram of a structure of encoders employed in the above-mentioned embodiment.

It should be noted here that, in the tone level information encoder 12 and resolution information encoder 17 shown in FIG. 2, there is not used such encoding as can restrict the degree of redundancy in terms of information, such as Huffman encoding, arithmetic encoding and the like.

Next, description will be given in brief of a procedure of decoding employed in the present embodiment. At first, in accordance with the above-mentioned block select information, it is identified which one of the encoders 4a to 4c shown in FIG. 1 was selected in encoding, and the tone level information La, Ld and resolution information respectively shown in FIG. 3 are decoded. In the present embodiment, due to the fact that there is not employed any encoding system such as Huffman encoding system, the binary digits, which are arranged in a predetermined order and with a bit length, can be read sequentially. Next, by using the tone level information La, Ld, a distance between La+Ld/2 and La−Ld/2 is divided into equal distances to thereby calculate quantization levels Q1, Q2, - - - . The image information is reproduced from the calculated quantization levels and the resolution information. In this case, if the resolution information is selectively missing, for example, in a horizontal or vertical direction, then the tone levels of a reproduced peripheral picture element is used to execute interpolation, thereby reproducing the missing picture element tone. This procedure can decode the encoded image.

Figure 5:
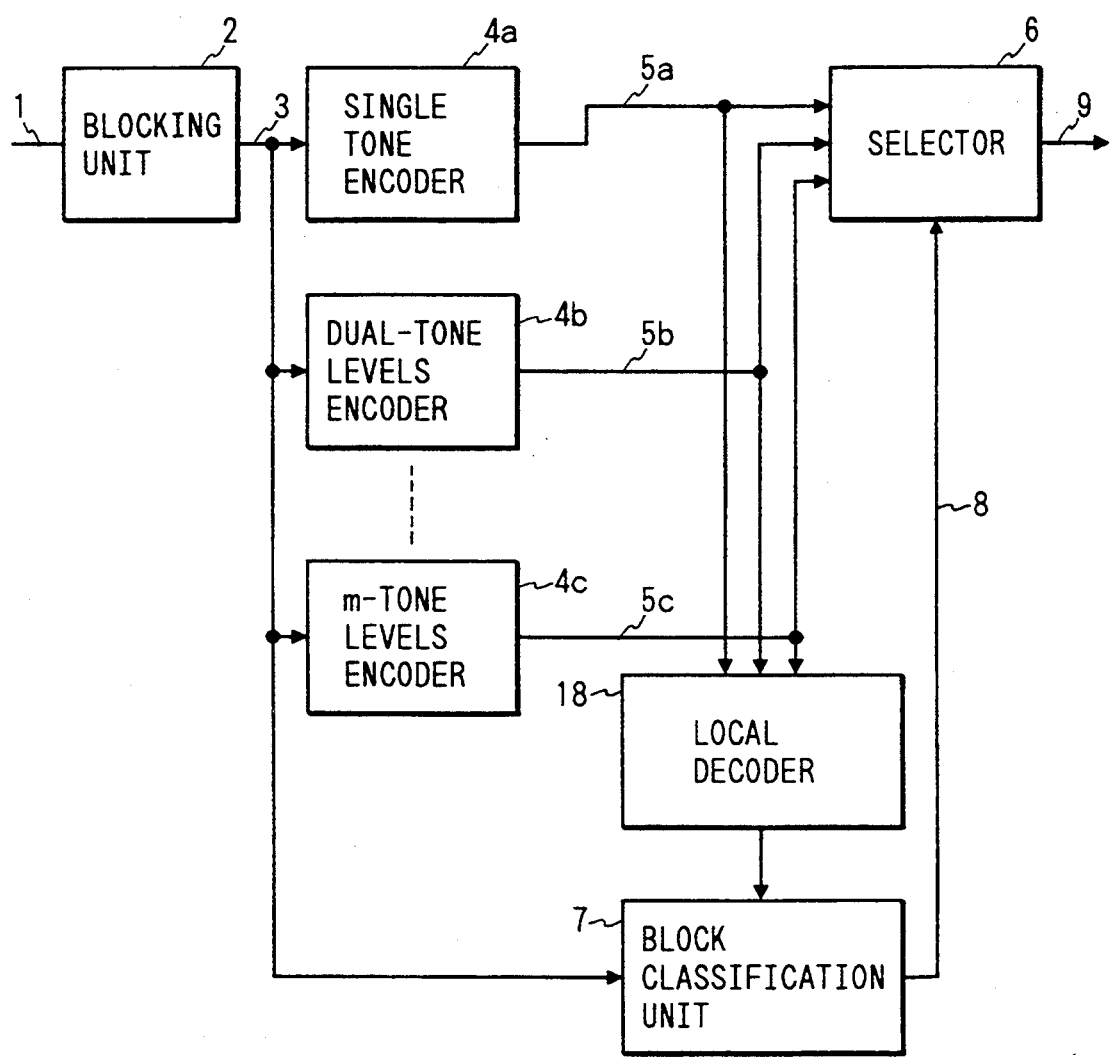
FIG. 5 is a block diagram of a structure of another embodiment of an image encoding device according to the invention.

In FIG. 5, there is shown another embodiment of an image encoding device according to the invention. This embodiment is different from the first embodiment shown in FIG. 1 in that the respective pieces of encoded image information 5a to 5c encoded simultaneously by the encoders 4a to 4c are supplied to a local decoder 18 and the selector 6 is controlled by the output of the local decoder 18. The local decoder 18 decodes the respective pieces of encoded image information 5a to 5c, the block classification unit 7 compares these pieces of encoded image information with the image information 3 before encoded and, in accordance with the comparison result 8, the selector 6 selects and outputs the encoded image information that has the least distortion. That is, the block classification unit 7 acts as distortion computing means. As a measure of distortion, a square error mean may be used or the accumulated value of the absolute values of differences may be used.

In the second embodiment of the invention shown in FIG. 5, it is not necessary to classify whether an image which is input every block belongs to a block having a relatively smooth tone level gradient, or having a greatly varying tone level, or having a tone distribution intermediate between the two tone gradients. In order to judge which of the encoders should be used to encode the image information input every block for the least deterioration of the quality of the image, in the first embodiment shown in FIG. 1, there are used the distribution value of the picture element tone in the block and the differential coefficient in the spatial axis, but it cannot always be said that this shows the best classification. On the other hand, in the second embodiment shown in FIG. 5, the best classification can be realized by use of the distortion measure such as at least the square error mean and the accumulated value of the absolute values of differences. For this reason, the second embodiment is able to execute encoding with less image quality deterioration.

Figure 6:
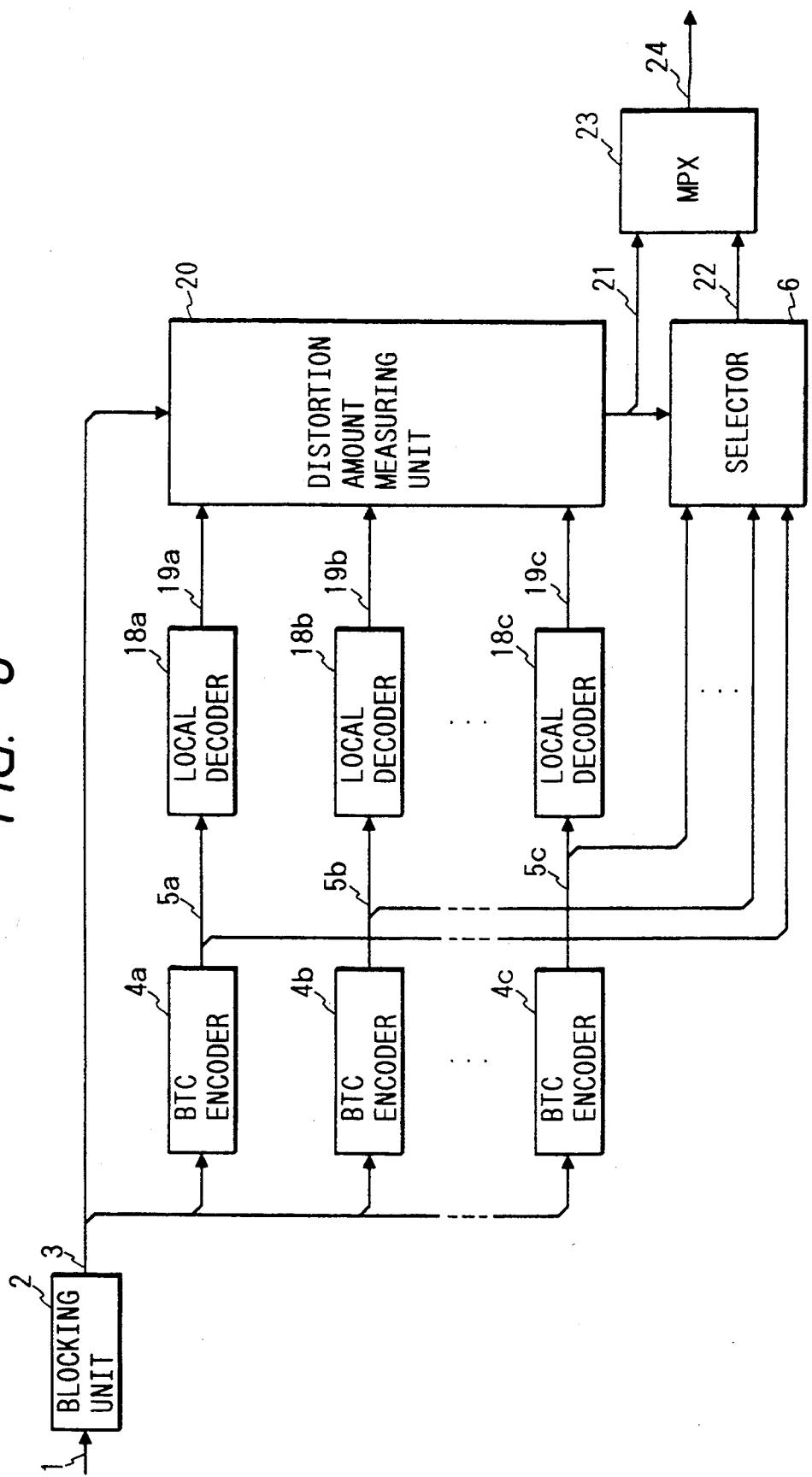
FIG. 6 is a block diagram of a structure of still another embodiment of an image encoding device according to the invention.

Next, description will be given below of the third embodiment of an image encoding device according to the invention with reference to FIG. 6. The third embodiment is different from the second embodiment shown in FIG. 5 in that the respective pieces of encoded image information 5a to 5c simultaneously encoded by the encoders 4a to 4c are respectively supplied to and decoded by local decoders 18a to 18c which are provided so as to respectively correspond to the encoders 4a to 4c, and decoded image blocks 19a to 19c respectively from the respective local decoders 18a to 18c are compared with the input image block 3 to thereby select the encoded image information that has the least distortion. In other words, the decoded image blocks 19a to 19c respectively from their respective local decoders 18a to 18c are supplied to a distortion amount measuring unit 20. The distortion amount measuring unit 20 finds the amounts of distortion of the respective decoded image blocks 19a to 19c with respect to the input image part 3 and outputs mode information 21 which decides the encoder that provides the decoded image block having the least distortion, that is, having the highest amount of truncation. In accordance with the mode information 21, the selector 6 selects one of the three pieces of encoded image information 5a to 5c that provides the least distortion. After such selection, BTC encoded data 22 is multiplexed with the mode information 21 in a multiplexing unit 23 to thereby provide encoded data 24 for each of the input image blocks 3.

Next, description will be given below in detail of the operation of the present invention. A digital input image 1 is divided by a blocking unit into block units each of which consists of m×n picture elements. For each of the input image blocks 3 obtained as a result of this division, the image is encoded by BTC encoders a to 4c in k number of modes ranging from mode 1 to mode k. In the BTC encoding mode, there are previously set combinations each of a sub-sample to execute truncation of the resolution information and quantization to execute truncation of the tone level information, for example, when k=3, the combinations are set in the following manner:

mode 1: a combination of a $\frac{1}{2}$ sub-sample and a dual-level quantization;

mode 2: a combination of a $\frac{1}{4}$ sub-sample and a 4-levels quantization; and, mode 3: a combination of $\frac{1}{8}$ sub-sample and a 16-levels quantization. Here, the term "sub-sample" means the sub-sampling of the image, for example, a $\frac{1}{8}$ sub-sample means that a picture element is thinned out to thereby provide a picture element number of $\frac{1}{8}$.

Assuming that the sub-sample ratio of a mode i (provided that $1 \leq i \leq k$) is expressed as ss (i), the number of quantization levels is expressed as ql(i), and the number of tone levels of the picture element in the input image block 3 is expressed as N, then a compressibility r can be given in the following equation:

$$r = ss(i) \times \log_2 (ql(i))/\log_2 (N)$$

Here, if there is previously set a combination of the sub-sample ratio ss(i) and the number of quantization level ql(i) which can provide a constant r, then the input image block 3 can always be encoded by means of a constant amount of codes and, further, the compressibility can be previously specified when the input image block is encoded.

Next, the BTC encoded data 5a to 5c respectively obtained by the BTC encoders 4a to 4c are supplied to the local decoders 18a to 18c each having k number of modes to thereby obtain BTC decoded image blocks 19a to 19c each having k kinds of modes. The BTC decoded image block that is most approximate to the input image block 3 is found from these BTC decoded image blocks 19a to 19c by the distortion amount measuring unit 20.

Here, it is assumed that the respective picture elements in the input image block are expressed as $s_1$ (l=1, 2, --- m.n), the respective picture elements in the BTC decoded image block locally decoded after BTC encoded in the mode i are expressed as x, (i) (l =1, 2, ---, m.n), and $S = \{s_1, s_2, ---, s_{m \cdot n}\}$, $X(i) = \{x_1(i), x_2(i), ---, x_{m \cdot}(i)\}$, then an evaluation function d (S, X (i)) representing the amount of truncation can be given in the following equation:

$$d(S, X(i)) = \Sigma |s_1 - x_1(i)| : L1\text{-Norm}$$

or $$d(S, X(i)) = \Sigma (s_1 - x_1(i))^2 : L2\text{-Norm}$$

This is hereinafter referred to as an amount of distortion with respect to the mode i. In the above equations, L2-Norm expresses a Euclidean distance which represents a distance between two points on a multidimensional coordinate axis, while L1-Norm expresses a CHEBYCHEV distance which is a truncation solution of the above distance.

The distortion amount measuring unit 20 detects amounts of distortion with respect to the respective modes ranging from 1 to k, and selects the mode that has the least amount of distortion to thereby decide the BTC encoding mode with respect to the input image block. This operation can be expressed with respect to all modes i as follows:

$$\text{mode} = \min\{d(S, X(i))\}(1 \leq i \leq k)$$

Since the total number of the modes is k, the evaluation function d (S, X(i)) is calculated k−1 times. Here, the term "mode" is a variable which represents a mode.

By means of the foregoing processings, the BTC encoding mode (mode information) 21 that has the least amount of distortion can be found. Finally, after the BTC encoding data 22 corresponding to the BTC encoding mode 21 is selected by the selector 6, the BTC encoding mode 21 is multiplexed by the multiplexing part 23 to thereby find the final BTC encoding data 24 with respect to the input image block.

Figure 7:
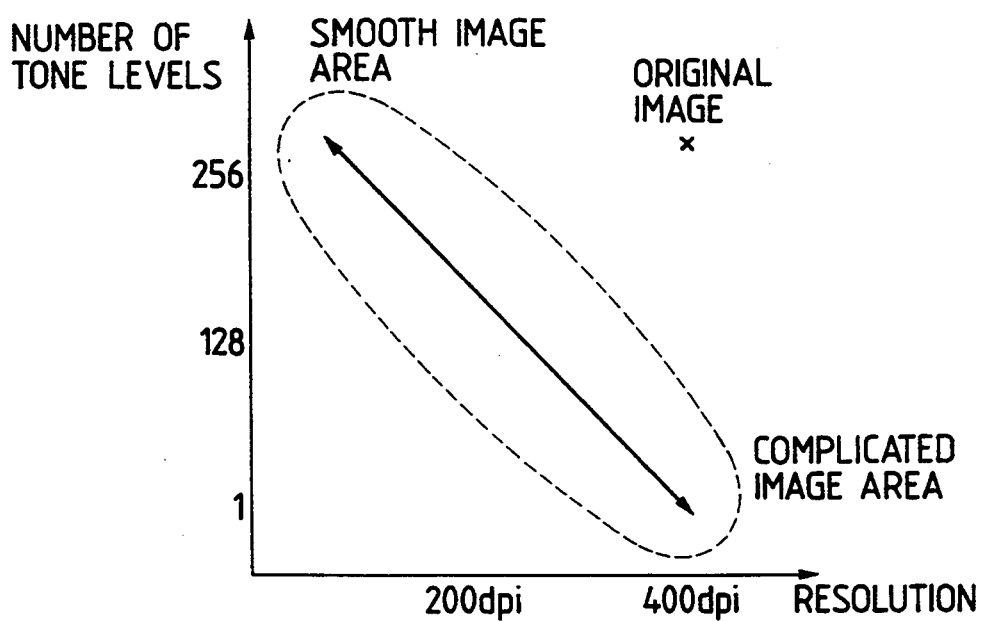
FIG. 7 is a graphical representation to explain the principles of the operation of the embodiment shown in FIG. 6.

FIG. 7 is an explanatory diagram showing the principles of the operation of the above-mentioned BTC encoding. In general, a human visual characteristic has the following features:

(a) a smooth image area:
Sensitivity to tone levels is high whereas sensitivity to resolutions is low.

(b) a complicated image area:
Sensitivity to resolutions is high whereas sensitivity to tone levels is low.

These features are known as Weber's law: For this reason, with respect to the useful information that is owned by an original image having 256 tone levels and a resolution of 400 dpi, it is not always necessary to retain all data depending on the features of the image area. Accordingly, the encoding device shown in FIG. 6 is arranged such that it sets two or more kinds of BTC encoding modes, each of which is a truncation combination of the number of tone levels and resolution, and executes encoding by use of a mode which is the most approximate to the input image. For example, when encoding an image having a heavily varying tone, the encoding device gives preference to the resolution and thus increases the resolution and decreases the number of tone levels before encoding is executed. On the other hand, when encoding an image having a gently varying tone, the device gives preference to the tone level and thus increases the number of tone levels and decreases the resolution before encoding is executed. In this manner, the length of codes can be made constant. The constant or fixed length encoding corresponds to the fact that a combination of the BTC encoding modes is located on a straight line in a graph shown in FIG. 7.

In the respective embodiments described before, due to the fact that the number of bits to be allocated to the number of tone levels and the number of bits to be allocated to the resolution are switched dynamically according to the properties of the images, an efficient compressing processing can be performed by use of a fixed or constant number of bits.

Next, description will be given below of yet another or fourth embodiment of an image encoding device according to the invention with reference to FIG. 8, in which embodiment expandability and realizability in enhancing the performance of encoding are improved and also the optimum mode from the viewpoint of a visual characteristic can be selected.

The input image 1 is converted by the blocking unit 2 into an input block 3 which consists of m×n picture elements and is then supplied to an average value separator 25. The average value separator 25 calculates the average value of the input block 3 to be output as average value information 26 and, at the same time, subtracts the average value from the input block 3 and then outputs the result as an average value separated block 27. A mode discriminator 28 analyzes the statistical and spatial feature amounts of the average value separated block 27 and, in accordance with the analysis result, obtains a truncation parameter, that is, mode information 29 in the truncation encoding. An adaptive truncation encoder 30 executes resolution and tone level truncations with respect to the average value separated block 27 in accordance with the mode information 29, and outputs a truncation block 31. The mode discriminator 28 and adaptive truncation encoder 30 will be described in detail later.

The average value information 26 from the average value separator 25, the mode information 29 from the mode discriminator 28 and the truncation block 31 from the adaptive truncation encoder 30 are supplied to and multiplexed by a multiplexer 32, and are then output as coded data 33 from the multiplexer 32.

The mode discriminator 28 shown in FIG. 8 will be described in detail with reference to FIG. 9. The average value separated block 27 from the average value separator 25 is supplied to a shape analyzer 34 which is used to analyze shape information out of the statistical and spatial feature amounts.

The shape analyzer 34 executes a pattern matching between a set of representative vectors respectively having representative shape information and the average value separated block 27 which is a block consisting of m×n picture elements. The analyzer 34 includes a pattern matching device which outputs a vector index 36 representing a representative vector selected by selecting the representative vector that has the most truncation shape information, and a shape mapping table 37 which obtains from the vector index 36 a candidate value for a parameter relating to the resolution truncation and outputs the candidate value as shape information 38.

Also, the average value separated block 27 is also supplied to a gain analyzer 39 which is used to analyze gain information in the block consisting of m×n picture elements among the statistical and spatial feature amounts. The gain analyzer 39 includes a distribution calculator 40 which calculates and outputs a distribution value 41 of the value of m×n picture elements in the average value separated block 27, a histogram counter which counts a frequency distribution of the value of m×n picture elements in the average value separated block 27 and then outputs the frequency distribution as histogram information 43, and a gain mapping table 44 which obtains a candidate value for a parameter on the tone level truncation from the distribution value 41 and histogram information 43 and then outputs the parameter candidate value as gain information 45.

The output of the shape analyzer 34 and the output of the gain analyzer 39 are supplied to a mode classification unit 46, in which an truncation parameter, that is, mode information is obtained from the shape information 38 and gain information 45.

Next, description will be given in detail of the above-mentioned adaptive truncation encoder 30 with reference to FIG. 10. The average value separated block 27 is supplied to an adaptive sub-sampler 47 which is used to execute sub-sampling for resolution truncation. In the adaptive sub-sampler 47, in accordance with a sub-sample pattern 49 supplied from a sub-sample pattern generator 48, the m×n picture elements of the average value separated block 27 are sub-sampled. In the sub-sampling, the sub-sample pattern generator 48, in accordance with the parameter on the resolution truncation among the mode information 29, controls the sub-sample pattern 49. A sub-sample block 50 which is sub-sampled by the adaptive sub-sampler 47 is supplied to an adaptive quantizer 51. In accordance with the parameter on the tone level truncation among the mode information 29, the adaptive quantizer 51 executes tone level truncation or quantization and then outputs an truncation block 31.

In this quantization, at first, a dynamic range is found from the maximum and minimum values of the picture elements in the average value separated block and the picture element values in the average value separated block are normalized by this dynamic range and, after then, the quantization is executed in accordance with the parameter on the tone level truncation. Also, the maximum and minimum values of the picture elements in the average value separated block, after quantized by means of a given feature, are added to coded data which will be described later. However, it should be noted here that it is not always necessary to quantize the maximum and minimum values.

Next, description will be given of the operation of the embodiment shown in FIGS. 8 to 10.

Figures 11A, 11B, 11C:
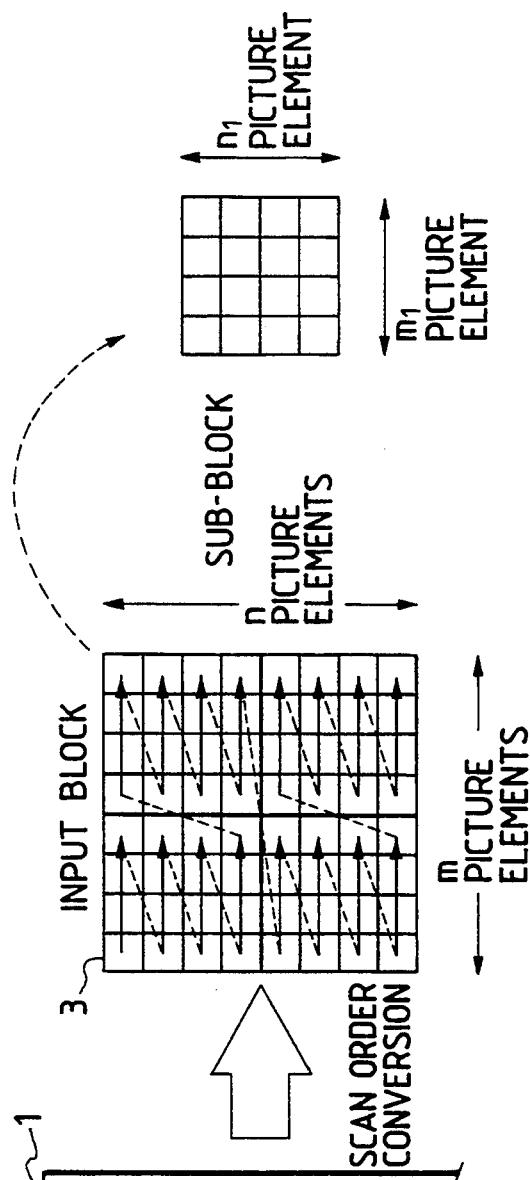
FIGS. 11(a), 11(b), 11(c) are explanatory diagrams showing the scan conversion of an image.

As shown typically in FIG. 11(a), the input image 1 input by means of raster scanning is converted by the blocking unit 2 into an input block 3, as shown typically in FIG. 11(b). From now on, encoding processings are all performed independently of one another in blocks with the input block 3 as a unit.

The input block 3 is supplied to an average value separator 25. The average value separator 25 calculates an average value $\mu$ of the m×n picture element values $S_{ij}$ (i=1, 2, - - -, m, j=1, 2, - - -, n) constituting the input block 3, that is, average value information 26, and then subtracts the average value $\mu$ from the respective picture element values of the m×n picture elements constituting the input block 3. The separator 25 calculates an average value separated block 27 from the values $X_{ij}$ (i=1, 2, - - -, m, J=1, 2, - - -, n) of the m×n picture elements which have been average value separated. Here, relationships among $S_{ij}$, $\mu$ and $X_{ij}$ are expressed in the following equations:

$$\mu = \left( \sum_{i=1}^{m}, \sum_{j=1}^{n} S_{ij}/(m \times n) \right)$$

$$X_{ij} = S_{ij} - \mu$$

The mode discriminator 28 analyzes the statistical and spatial feature amounts of the average value separated block 27 and, in accordance with the analysis results, outputs the mode information 29 that is a truncation parameter.

As shown in FIG. 9, the shape analyzer 34, which is a part of the mode discriminator 28, analyzes the shape information to thereby obtain a candidate value for the resolution truncation parameter. Similarly, the gain analyzer 39 analyzes the gain information to thereby obtain a candidate value for the tone level truncation parameter. Also, mode classification unit 46 obtains the truncation parameter, that is, the mode information 29 from the resolution truncation parameter candidate value and the tone level truncation parameter candidate value.

The shape analyzer 34 analyzes the shape information representing the two-dimensional direction of the tone level variations and the complexity of the tone level variations of the average value separated block 27 and, in accordance with the analysis result, obtains a candidate value for the resolution truncation parameter which is used to approximate the resolution of the average value separated block 27.

The pattern matching device 35, which is provided within the shape analyzer 34, pattern matches a representative vector set having previously prepared representative shape information and a block to be analyzed (which is hereinafter referred to as an analysis block), that is, the average value separated block 27, thereby executing the shape information analysis.

Figure 12:
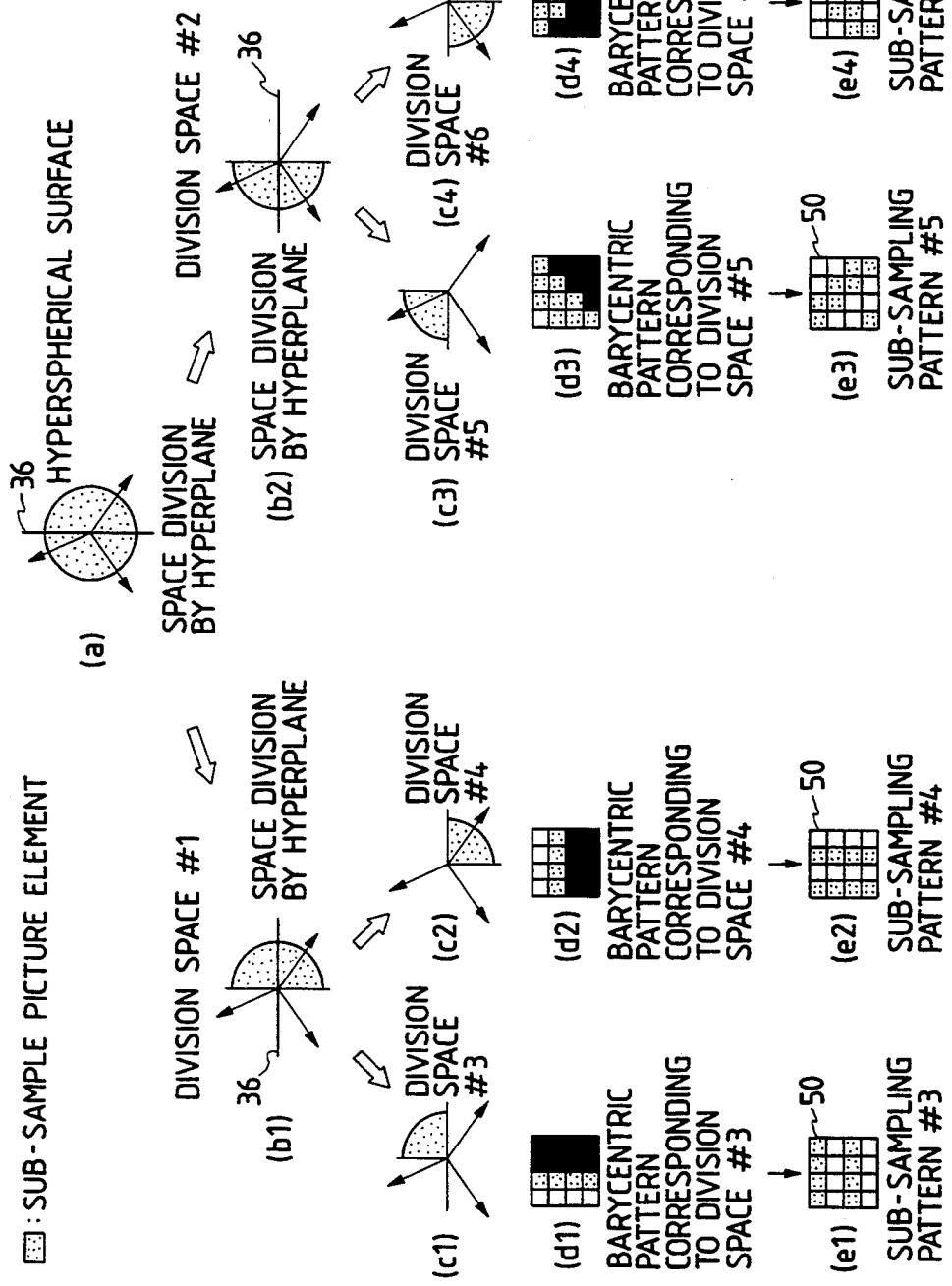
FIG. 12 is an explanatory diagram showing the principles of a shape information analysis.

FIG. 12 shows typically the contents of the representative vector set that has the representative shape information previously prepared.

At first, the sample of an input block for training consisting of a representative image is normalized and the normalized sample is defined as a group of samples distributed on a unit hyperspherical surface. Next, there is obtained a principal component which is an axis to divide the normalized sample into two parts. A well known principal component analysis method is applied to the above group of samples on the unit hyperspherical surface and the group of samples is divided into two parts by use of a high vector having the highest contribution rate, that is, a hyperplane to be defined by a first principal component vector (see FIG. 12(a)). The hyperplane is a space which includes the representative vector 36. And, it is checked in which side of the principal component are included the respective vectors of the samples on the above-mentioned unit hyperspherical surface. Next, as shown in FIGS. 12 (b1), (b2), (c1) to (c4), a hyperplane to be defined by the principal component vector in the respective spaces obtained as a result of division (that is, division spaces #1, #2) is used to further divide the division spaces in half (into division spaces #3, #4, division spaces #5, #6). The above-mentioned dividing processing is repeated a given number of times. If such dividing processing is repeated n number of times, then there are obtained representative vector sets in n stages and in a binary tree structure. FIGS. 12 (d1) to (d4) respectively show barycentric patterns which respectively correspond to the respective division spaces #3 to #6. FIGS. 12 (d1) to (d4) show that the directions indicating the two-dimensional variations of the tone level variations are respectively a horizontal direction, a vertical direction, a left oblique direction and a right oblique direction. These directions respectively correspond to the direction v of the analysis block. There are previously set sub-sampling patterns which respectively correspond to the respective barycentric patterns and are respectively shown in FIGS. 12(e1) to (e4). The sub-sampling patterns are decided depending on the barycentric patterns selected. The sampling rate of the sub-sampling pattern corresponds to r.

The adaptive truncation encoder 30 finds the amount of truncation between the input block and representative vector set by means of a binary tree search, and considers as an index the career of a path until it reaches the final stage. Then, the encoder 30 selects one of the sub-sampling patterns that corresponds to the index and similarly selects one of the sub-sampling rates that corresponds to the index. As the binary tree search method, there can be employed such a tree search method as disclosed, for example, in A. Buzo et al,: Speech coding based upon vector quantization, IEEE Trans. Acoust. Speech & Signal Process, ASSP-28.5, pp. 526–574. Also, in order to enhance the efficiency of the search operation, it is desirable to employ such a method as proposed by the present applicants in the specification of a patent application under the title of the invention "an image signal analyzing method" filed on Jun. 2, 1991.

By means of the above-mentioned shape information analysis, there are obtained the direction and complexity of the tone level variations of the analysis block, and the vector index 36 can be obtained from the index of the representative vector.

The operation of obtaining the amount of truncation is executed by pattern matching the analysis block and representative vector set.

Assuming that an analysis block consisting of m×n picture elements is expressed as $x=\{x_i \mid i=1, 2, ---, m \times n \}$ and a representative vector set consisting of k number of representative vectors is expressed as $y=\{Y_i \mid i=1, 2, ---, k\}$, then a pattern matching can be defined by the following equation.

For all values of i, the following equation holds:

$$d(x, y_p) = \min \{d(x, y_i)\}(i=1, 2, ---, k)$$

where $d(x, y_i)$ is a distortion measure which is defined by a square distortion representing a Euclidean distance or the like; and, p is the index of the representative vector, that is, the vector index 36 and this shows that the representative vector $x_p$ represented by p is selected as a representative vector which has shape information most approximate to the analysis block. The vector index 36 is supplied to the shape mapping table 37.

The shape mapping table 37 obtains the candidate value for the resolution truncation parameter, that is, the shape information 38 from the vector index 35 and then outputs the shape information 38. The candidate value for the resolution truncation parameter consists of the direction v (p) of the analysis block representing the two-dimensional direction of the tone level variations and the sub-sample rate r (p) representing the complexity of the tone level variations.

Also, the gain analyzer 39 shown in FIG. 9 analyzes the gain information representing the amplitude of the average value Separated block 27 and the frequency distribution of the picture element values and, in accordance with the analysis result, obtains a candidate value for a tone level truncation parameter which is used to approximate the tone levels of the average value separated block 27. The analysis of the gain information is executed by counting the distribution value and histogram (that is, accumulated frequency distribution) of the values of the m×n picture elements constituting the average value separated block 27.

The dispersion calculator 40, which is disposed within the gain analyzer 39, calculates the distribution value 41 of the values of the m×n picture elements constituting the average value separated block 27. The distribution value of the m×n picture elements with the average value separated therefrom is defined by the following equation:

$$\sigma^2 = \left(\sum_{i=1}^{m}\sum_{j=1}^{n} X_{ij}^2\right)/(m \times n)$$

or $$\sigma = \left(\sum_{i=1}^{m}\sum_{j=1}^{n} |X_{ij}|\right)/(m \times n)$$

Description will be given hereinafter by use of the distribution value $\sigma$.

The distribution value $\sigma$ is compared with one or more threshold values, for example, two threshold values for discriminating among the high, middle and low states of distribution and it is classified to which of large, middle and small distributions the distribution belongs, and the classification result provides one of the feature amounts in the above-mentioned tone level direction.

Figure 13A:
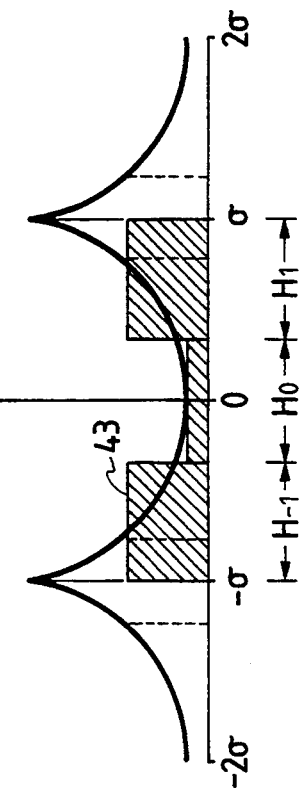
FIGS. 13(a), 13(b) are explanatory diagrams showing the principles of a gain information analysis.
Figure 13B:
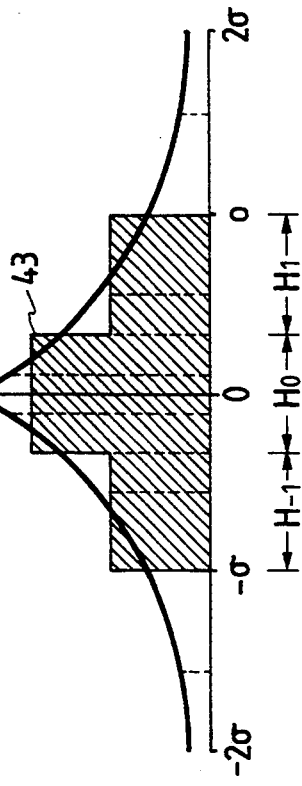

A histogram counter 42, as shown in FIG. 13, threshold processes the average value separated block 27 in accordance with the distribution value $\sigma$ to count a frequency. In other words, a threshold value is set for $\pm\sigma/a$ and the frequency is counted at three positions, that is, in three ranges including a first range which is less than $-\sigma/a$, a second range equal to or more than $-\sigma/a$ and less than $\sigma/a$, and a third range more than $\sigma/a$. Here, a expresses a real number which is 1 or more, and in the present embodiment it is assumed to be 3, for example. The frequency values counted at the three positions are respectively expressed as $H_{-1}$, $H_0$, $H_1$. As shown in FIG. 13, in accordance with the frequency values $H_{-1}$, $H_0$, $H_1$, it is checked whether the histogram has a single peak distribution (see FIG. 13(a)) or a double-peak distribution (see FIG. 13(b)) and, the check result is obtained as histogram information 43. For example, when $H_{-1} \leq H_0$ and $H_0 \geq H_1$, the histogram is considered as a single peak distribution and, for other cases, the histogram is considered as a double-peak distribution.

The histogram information 43 is used to determine the kinds of images. That is, due to the fact that a picture image provides a single peak distribution and a character image provides a double-peak distribution, the kinds of the images can be determined according to the distribution states.

Here, the threshold processing by means of $-\sigma/a$ corresponds to a processing in which, in order to remove effects caused by a difference between the dynamic ranges of the respective input blocks, the respective picture elements in the average value separated block 27 are divided and normalized by the above-mentioned distribution value to thereby obtain the histogram.

Next, a gain mapping table 44 obtains a candidate value for the tone level truncation parameter, that is, gain information 45 from the distribution value 41 and histogram information 43. The tone level truncation parameter candidate value includes a feature c of the tone level truncation or quantization and a level number 1. Here, the term "the feature c of quantization shows the kinds of distributions of the histogram. For example, when the distribution value 41 is large, it is expected that the width of the tone distribution is large and, therefore, many level numbers 1 are set in order to enhance the tone level property. However, when the histogram information 43 shows a double-peak distribution, that is, when an image is a character image, the number of tone levels is decreased even when the distribution value 41 is large so as to be able to encode the character clearly.

A mode classification unit 46 obtains an truncation parameter or mode information 29 from the candidate value for the resolution truncation parameter and the candidate value for the tone level truncation parameter. When executing fixed length encoding to control the amount of codes to a constant or fixed amount every $m \times n$ picture elements, the sub-sample rate r in the resolution truncation parameter candidate value relating to the amount of codes and the level number 1 in the tone level truncation parameter candidate value are operated to thereby control the amount of data of the truncation block 31 which are output from an adaptive truncation encoder 30 to be discussed later. Here, since the amount of data of the truncation block 31 is in proportion to p.log$_2$ 1, the value of p.log$_2$ 1 may be controlled to a fixed value. The controlled resolution truncation parameter and tone level truncation parameter are combined together and are then output as the mode information 29. Also, if the resolution truncation parameter candidate value and the tone level truncation parameter candidate value are respectively used the mode information as they are, then the quality of the picture reproduced can be maintained at a constant level.

Figure 8:
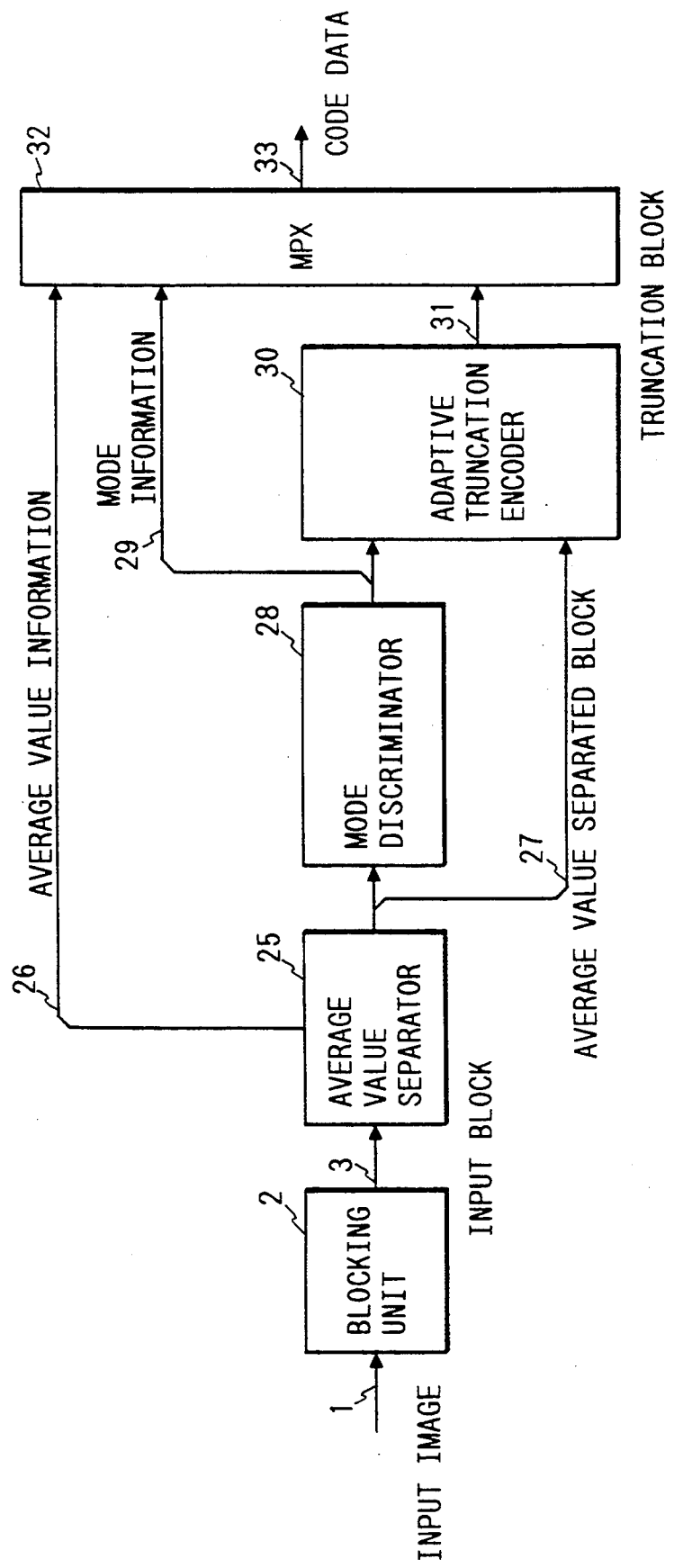
FIG. 8 is a block diagram of a structure of a further embodiment of an image encoding device according to the invention, in which an adaptive truncation encoder is used.

The adaptive truncation encoder 30 shown in FIG. 8, in accordance with the mode information 29, executes resolution truncation and tone level truncation with respect to the average value separated block 27.

Description will be given below in detail of the operation of the adaptive truncation encoder 30 with reference to FIG. 10.

A sub-sample pattern generator 48 obtains a pattern 49 to sub-sample the average value separated block 27 in accordance with the resolution truncation parameter in the mode information 29, that is, the direction v of the analysis block representing the two-dimensional direction of the tone level variations and the sub-sample rate r representing the complexity of the tone level variations. The pattern 49 may be, for example, a pattern to thin out a block consisting of $m \times n$ picture elements one half only in the vertical direction (see FIG. 12 (e1)), a pattern to thin out the block one half only in the transverse direction (see FIG. 12 (e2)), a pattern to thin out the block one half in the vertical and transverse directions respectively (see FIG. 12 (e3), (e4)), which depends upon the combinations of the direction v and rate r.

The adaptive sub-sampler 47 sub-samples the average value separated block 27 in accordance with the sub-sampling pattern 49.

An adaptive quantizer 51 sub-samples a sub-sampling block 50 in accordance with the tone level truncation parameter in the mode information 29, that is, the quantization feature c and quantization level number 1. When the quantization feature c provides a single peak distribution as shown in FIG. 13(a), the adaptive quantizer selectively uses a quantizer which is best for the single peak distribution (for example, a picture image). Also, for the double-peak distribution as shown in FIG. 13(b), the quantizer selectively uses a quantizer which is best for the double-peak distribution (for example, a character image). Here, as a quantizer, for example, there may be used a non-linear quantizer such as the optimum quantizers used in the above-mentioned MAX's reference for each of the distributions. That is, as disclosed in the MAX's reference, since a quantization feature best for a known distribution can be designed, there may be used a quantizer which has such quantization feature. There are prepared quantizers according to the combinations of the quantization feature c and quantization level number 1. For example, there are prepared quantizers respectively of 2, 4, 8, 16 levels which are adapted to the respective single peak and double-peak distributions, and an optimum one is selected out of them in accordance with the feature c and level number 1.

Figure 14:
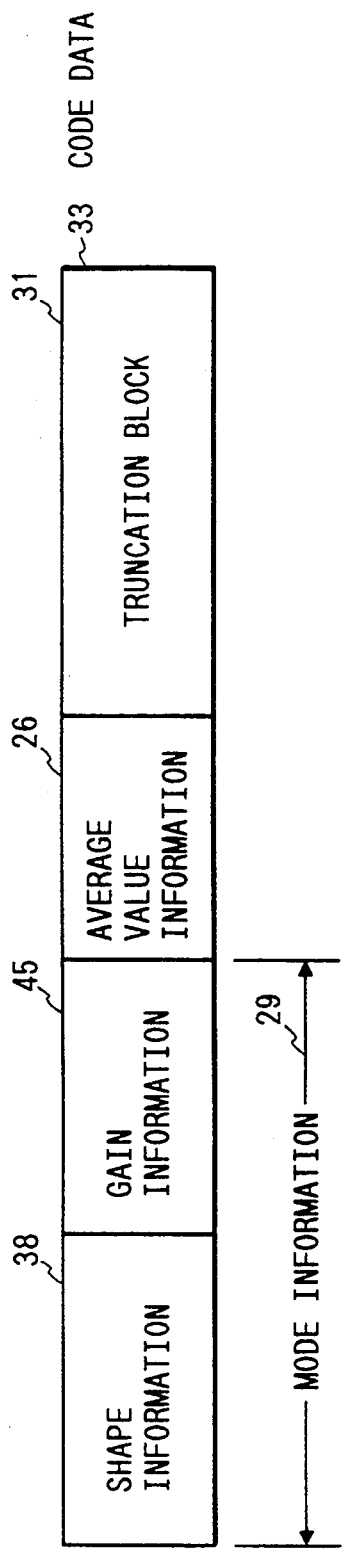
FIG. 14 is an explanatory diagram showing the structure of coded data.

The multiplexer 32 shown in FIG. 8 multiplexes the mode information obtained from the above-mentioned mode discriminator 28, the average value information 26 obtained from the average value separator 25 and the truncation block 31 obtained from the adaptive truncation encoder 30 to thereby form such coded data 33 as shown in FIG. 14. As described before, in quantization, if a dynamic range is obtained from the maximum and minimum values of the picture element values in the average value separated block and the picture element values in the average value separated block are normalized by the dynamic range, the maximum and minimum values are quantized by a given feature and are then added to the coded data 33.

According to the above-mentioned embodiment shown in FIGS. 8 to 10, there can be obtained the following effects:

(1) Because the combination of the encoding modes can be changed freely by the mode classification unit 46, the present embodiment provides an excellent expandability.
(2) Even when the kinds of the encoding modes are increased in order to improve the performance, the amount of processings is not increased.
(3) By setting the decision standards of the mode discriminator 28, that is, by setting the standards in consideration of the visual feature in the shape mapping table 37, gain mapping table 44 and mode checker 45, it is possible to select the mode that is best from the viewpoint of the visual feature.

Therefore, it is possible to realize an encoder which is suitable for encoding for use in a page memory of which a simplified encoding processing is required.

Next, description will be given below of an embodiment in which the present invention is applied to a color still image encoding method.

With respect to the color still image encoding method, JPEG (Joint Photographic Experts Group), which is a community consisting of ISO (International Standardization Organization and CCITT (Consultative Committee of International Telegram and Telephone), recommends an ADCT (Adaptive Discrete Cosine Transform) system as an international standard system. The function of the ADCT system is divided into an essential function to execute a basic application and an optional function to execute a wider range of application, the optional function including sequential reproduction encoding as a part thereof. In the sequential reproduction encoding, the image information of one screen is not encoded once, but, at first, the image information having low resolution and tone level is encoded and, after then, the respective pieces of image information having high resolution and tone level are encoded sequentially.

When performing this sequential reproduction encoding, the image component that could not be encoded in one encoding, that is, an encoding error is encoded again. In order to obtain the encoding error, the image once encoded, that is, the coded data is decoded by a local decoder which is provided within the encoder, thereby obtaining a difference between the decoded data and the image before encoded, namely, the original image. For this reason, during a period when the one-time encoding and decoding are being executed, the original image must be held in a memory which is provided within the encoder. This memory requires a large capacity because it stores all picture element values corresponding to at least a piece of an image. In view of the above fact, in an embodiment which will be described below, the image information is encoded and is then stored in a memory to thereby reduce the capacity of the memory.

Figure 15:
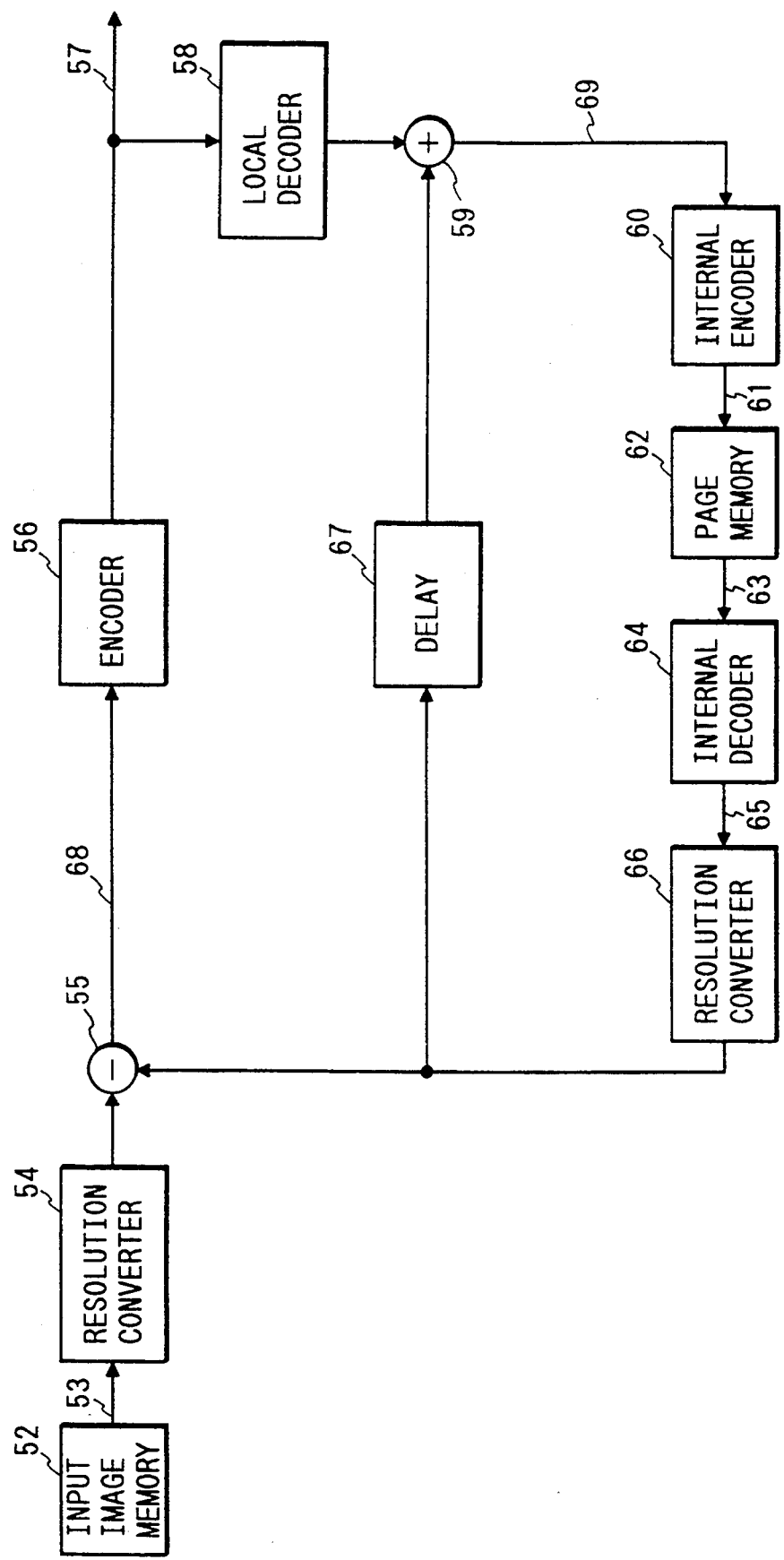
FIG. 15 is a block diagram of a structure of a sequential reproduction encoder of the present invention is applied.

In FIG. 15, there is shown a block diagram of an embodiment of the invention in which a memory capacity is reduced.

An input image 53 from an input image memory 52 is supplied through a resolution converter 54 and a subtractor 55 to an ADCT encoder 56 and the input image 53 is encoded in an image block consisting of $m \times n$ picture elements by the ADCT encoder 56, thereby providing ADCT coded data 57. Here, it is assumed that the ADCT encoder 56 incorporates therein a blocking unit. Also, the ADCT coded data 57, after decoded by an ADCT decoder 58, is supplied through an adder 59 to an internal encoder 60, which is adapted to encode the data in an image block, for example, consisting of $m_1 \times n_1$ picture elements (see FIG. 12(c)), the decoded data is again decoded by the internal encoder 60, and the data is then stored in a page memory 62 as an internally encoded ADCT local code image 61. Here, it is assumed that the local encoder 60 incorporates therein a blocking unit which obtains a block consisting of $m_1 \times n_1$ picture elements to be internally encoded from an image block consisting of $m \times n$ picture elements to be ADCT encoded. Internally encoded ADCT local coded data 63 from the page memory 62 is decoded by an internal decoder 64, which performs a reverse processing to the internal encoder 60, to thereby provide ADCT locally decoded image information 65. The locally decoded image information 65 is supplied through a resolution converter 66 to the subtractor 55. Also, the output of the resolution converter 66 is supplied to the adder 60 through a delay circuit 67 which performs delay corresponding to 1 stage (1 picture plane).

Next, description will be given below of the operation of the embodiment shown in FIG. 15. In this operation, the respective pieces of the image information of the original image are sequentially encoded every stage in the order of the image information having a low resolution toward the image information having a high resolution.

In the input image memory 52, there is stored the image information of the original image and the resolution of the image information is changed into a given resolution by the resolution converter 55. In the first stage, the resolution of the image information is changed into a lower resolution by the resolution converter 55, while in each of the stages the resolution of the image information is changed into a higher resolution sequentially.

In the first stage, the resolution of the input image 53 from the input image memory 52 is changed into a low resolution by the resolution converter 54 and then the low resolution input image is supplied to one input terminal of the subtractor 55. At this time, since no input is present at the other input terminal of the subtractor 55, the output of the resolution converter 54, as it is, is supplied to and encoded by the encoder 56 and is then output as the coded data 57. The coded data 57 in the first stage has a low resolution. Thus, if the coded data 57 of a low resolution relating to the image information is decoded in a receiving side (not shown), then there can be obtained the image information of a low resolution. The image information coded data 57 of a low resolution is supplied to the decoder 58 as well, in which it is decoded and is then supplied to one input terminal of the adder 59. At this time, since no input is applied to the other input terminal of the adder 59, the output of the decoder 58, as it is, is supplied to and encoded by the internal encoder 60 and is thus formed as the internal coded data 61, and then the internal coded data 61 is stored in the page memory 62. This completes the processings in the first stage.

In the second stage, the input image 53 is in turn changed into one having an intermediate resolution and is then supplied to one input terminal of the subtractor 55. In the second stage, in synchronization with the read-out of the input image 53 from the input image memory 52, the local coded data 63 is read out from the page memory 62 and is then decoded by the internal decoder 64 to thereby provide the internally decoded image information 65. After the resolution thereof is changed into an intermediate resolution by the resolution converter 66, the internally decoded image information 65 is supplied to the other input terminal of the subtractor 55 and at the same time it is supplied to the adder through the delay circuit 67. An image corresponding to a difference between the encoded image in the first stage and the image to be encoded in the second stage, which is found by the subtractor 55, that is, the encoded error image 68 is supplied to and encoded by the encoder 56 and is then output as the coded data 57. The coded data 57 in the second stage has an intermediate resolution. If the encoded error image coded data 57 of an intermediate resolution is decoded at the receiving side and is then added to the image of an intermediate resolution previously obtained by decoding the image information of a low resolution, then there can be obtained decoded image information of an intermediate resolution. The encoded error image coded data 57 of an intermediate resolution is supplied to the decoder 58 as well, in which it is decoded and is then supplied to the one input terminal of the adder 59. A decoded image 69 of an intermediate resolution obtained by means of addition by the adder 59 is encoded by the internal encoder 60 and is then stored in the page memory 62 as the coded data 61. This completes the processings in the second stage.

In the third stage, similarly, the input image 53, with the resolution thereof remaining unchanged, is passed through the resolution converter 54 and is then supplied to one input terminal of the subtractor 55. In the third stage, in synchronization with the read-out of the input image 53 from the input image memory 52, the coded data 63 is read out from the page memory 62 and is then decoded by the internal decoder 64 to thereby provide the internal code information 65. The internal code information 65 is changed into one having a high resolution by the resolution converter 66 and, after then, it is supplied to the other input terminal of the subtractor 55 and at the same time is supplied through the delay circuit 67 to the adder 59. The encoded error image 69 obtained by means of subtraction by the subtractor 55 is supplied to and encoded by the encoder 56 and is then output as the encoded data or coded data 57. The coded data in the third stage has a high resolution. If the encoded error image coded data 57 having a high resolution is decoded and is then added to the image having a high resolution previously obtained by decoding the image information of an intermediate resolution, then there can be obtained decoded image information having a high resolution.

According to the embodiment shown in FIG. 15, the image is encoded by the local encoder 60 and is then stored in the page memory 62, so that it is possible to reduce the capacity of the memory of a sequential reproduction encoder of an ADCT system. At this time, if image blocks in the ADCT encoder 56 and image blocks in the local encoder 60 are set such that the respective sizes thereof have a positive integral ratio to each other, then the encoding and decoding operation of the local encoder 60 can be performed in each of the image blocks which are larger in size. In this case, the local encoder 60 does not need to input and output the image data with respect to the ADCT encoder after all images are encoded and decoded.

As has been described heretofore, according to the present invention, the following effects can be obtained:

(1) Even when the size of a block for encoding is increased in order to enhance an encoding efficiency, there can be reduced the possibility that the image quality may be deteriorated, because one or more encoders each having two or more tone levels are used adaptively.

(2) Due to the fact that a plurality of encoders are used adaptively, for images such as character/line images and the like for which the reproduction of the resolutions thereof is visually important, for images such as person/landscape images for which the reproduction of the tone levels is visually important, and for images which have features intermediate between the former two kinds of images, deterioration in image quality caused by encoding is hard to detect visually. Also, a high encoding efficiency can be achieved without employing an encoding system such as Huffman's encoding system and the like which can restrict the degree of redundancy in terms of information theory.

(3) Due to the fact that an encoding efficiency is always set at a constant level in each of blocks without employing an encoding system such as Huffman's encoding system or the like which restricts the degree of redundancy in terms of an information theory, there is eliminated the need to control the encoding efficiency (amount of codes) when encoded image information is stored in a memory having a given capacity or when the encoded image information is stored in and reconstructed by a secondary memory device which has a constant or fixed transfer speed, so that it is possible to reduce or omit the capacity of a buffer memory. Also, only a part of encoded image information encoded in a certain number of images can be accessed independently in a block size, image editing such as cutting-out of the image, transcription thereof, movement thereof, erasing thereof and the like can be executed at high speeds as the encoded image information remains as it is.

Further, for example, when the BTC encoding mode is decided without previously executing encoding of the truncation of a plurality of blocks:

(4) Since there is no need to have previously decided an encoding mode, the combinations of the encoding modes can be freely changed and thus a high degree of expandability can be obtained.

(5) Even when the kinds of encoding modes are increased for enhancement of the performance of the device, there can be obtained a high degree of realizability because of a fixed amount of processings necessary for encoding/local decoding and for distortion amount measurement.

(6) Due to the fact that the encoding modes are switched by use of the feature amounts that are important in the visual properties, the picture quality from the view point of subjective evaluation at the same compressibility can be improved to a great extent. Also, under the same picture quality condition, the rate of compression can be enhanced. Further, the above-mentioned feature amounts can be used for secondary processings such as an edit/print processing and the like after the encoding processing.

What is claimed is:

1. An image encoding device comprising:

blocking means for sampling images and dividing each of said images into input blocks each including $m \times n$ picture elements where m and n are positive integers, respectively;

block classifying means for classifying based on a number of tone levels and resolutions within said input blocks; and a plurality of block truncation encoding means allocated such that the amount of codes of the tone levels and resolutions within said input blocks provides a given amount of codes in each of said input blocks, wherein said plurality of block truncation encoding means are switched in accordance with the results of said block classifying means to thereby execute their block truncation encoding operations, wherein said block classifying means comprises:

locally decoding means for decoding two or more pieces of encoded information obtained by encoding said input blocks simultaneously or sequentially by said plurality of block truncation encoding means and distortion computing means for obtaining an amount of truncation between said input blocks and a plurality of locally decoded blocks obtained by said locally decoding means, and wherein the classified results of said input blocks are obtained from one of said plurality of locally decoded blocks which has the minimum distortion.

2. An image encoding device comprising:

blocking means for sampling images and dividing each of said images into input blocks each including $m \times n$ picture elements where m and n are positive integers, respectively;

block classifying means for classifying based on a number of tone levels and resolutions within said input blocks; and a plurality of block truncation encoding means allocated such that the amount of codes of the tone levels and resolutions within said input blocks provides a given amount of codes in each of said input blocks, wherein said plurality of block truncation encoding means are switched in accordance with the results of said block classifying means to thereby execute their block truncation encoding operations, wherein when decoding said encoded information of said image encoding device, if the resolution information is selectively omitted in a given direction, then at least one picture element out of the decoded neighboring picture elements, which corresponds to said resolution information, is interpolated before said encoded information is reconstructed.

3. An image encoding device comprising:

blocking means for sampling images and dividing each of the images into input blocks each input block having $m \times n$ picture elements where m and n are positive integers;

average value calculating means for obtaining an average value in each of said input blocks;

average value separating means for subtracting said average value obtained by said average value calculating means from each of said picture elements in each of said input blocks;

analyzing means for analyzing features, in a resolution direction and a tone level direction, of average value separated blocks obtained by said average value separating means;

mode deciding means, in accordance with the results obtained by said analyzing means, for deciding a picture element sub-sampling shape and a picture element sub-sampling ratio in a preset number of said average value separated blocks and a number of tone levels in said average value separated blocks independently of one another;

resolution truncation means for sub-sampling one of the picture elements in said average value separated blocks in accordance with the picture element sub-sampling shape and picture element sub-sampling ratio decided by said mode deciding means;

tone level truncation means for quantizing the picture elements in said average value separated blocks sub-sampled by said resolution truncation means by the number of tone levels decided by said mode deciding means; and multiplexing means for multiplexing said average value from said average value calculating means, the decision result of said mode deciding means and the output of said tone level truncation means to thereby provide coded data.

4. An image encoding device as set forth in claim 3 wherein, when the features of said average value separated blocks in the resolution direction thereof is analyzed in said analyzing means, the amount of truncation between said average value separated blocks and each of sets of typical shape blocks each including $m \times n$ picture elements where m and n are positive integers or each including picture elements in the number that is obtained by dividing $m \times n$ by its positive integer ratio j where j is a positive integer, is found, the index of the typical shape block having the highest amount of truncation or the set of indexes of the typical shape blocks having the highest amount of truncation in each of said input blocks divided into j sets is considered as the first feature amount of said input blocks in the resolution direction thereof, at least said index or a ratio where said j sets of indexes coincide with each other is considered as a parameter representing the complexity of said average value separated blocks, and said complexity is considered as the second feature amount of said input blocks in said resolution direction thereof.

5. An image encoding device as set forth in claim 4, wherein, when the features of said average value separated blocks in the tone level direction thereof is analyzed in said analyzing means, the square average value separated blocks or a value obtained by averaging an absolute value of each of said picture element values is considered as a distribution value of said input blocks, the result of comparison of said distribution value with one or more kinds of threshold values is considered as a first feature amount in said tone level direction, a cumulative frequency distribution of the respective picture elements of said average value separation block is found, the form of said cumulative frequency distribution is corrected according to said distribution value and is then compared with predetermined one or more normalized distributions, and an index of the distribution coincident with or most approximate to said cumulative frequency distribution is considered as a second feature in said tone level direction.

6. An image encoding device as set forth in claim 5 wherein, when the picture element sub-sampling shape, picture element sub-sampling ratio and the number of tone levels of said input blocks are decided independently of one another by said mode deciding means, at first, previously prepared candidates for the picture element sub-sampling shape and picture element sub-sampling ratio of said average value separated blocks are found from the first and second feature amounts of said input blocks in the resolution direction thereof that can be found by said analyzing means, previously prepared candidates for the number of picture element tone levels of said average value separated blocks from the first and second feature amounts of said input blocks in the tone level direction thereof that can be found by said analyzing means independently of said first and second feature amounts in said resolution direction, and thereafter from sets of said candidates for said picture element sub-sampling shape and picture element sub-sampling ratio and said candidate for said number of tone levels there is selected one set which has a previously set constant compressibility to decide the picture element sub-sampling shape, picture element sub-sampling ratio and the number of tone levels of said input blocks, whereby the amount of codes can be controlled to a constant ratio in each of said input blocks.

7. An image encoding device as set forth in claim 5, wherein, when the picture element sub-sampling shape, picture element sub-sampling ratio and the number of tone levels of said input blocks are decided independently of one another by said mode deciding means, at first, previously prepared candidates for the picture element sub-sampling shape and picture element sub-sampling ratio of said average value separated blocks are found from the first and second feature amounts of resolution of said input blocks to be found by said analyzing means, a previously prepared candidate for the number of picture element tone levels of said average value separated blocks from the first and second feature amounts of said input blocks in the tone level direction thereof to be found by said analyzing means is found independently of said candidates, and thereafter from sets of said candidates for picture element sub-sampling shape and picture element sub-sampling ratio and said candidate for said number of tone levels there is selected one set which provides a previously set constant reconstructed image quality to decide the picture element sub-sampling shape, picture element sub-sampling ratio and number of tone levels, whereby the reproduction image can be controlled to a constant quality in each of said input blocks.

8. An image encoding device as set forth in claim 4, wherein, when the picture element sub-sampling shapes and picture element sub-sampling ratios of said plurality of average value separated blocks are previously set, the sets of the picture element sub-sampling shapes are set in a direction perpendicular to the direction in a two dimensional space of each of the sets of said typical shape blocks, and the sets of the picture element sub-sampling ratios of said average value separated blocks are set in accordance with the second feature amount in said resolution direction.

9. An image encoding device as set forth in claim 5 wherein, when picture elements in said average value separated blocks are quantized by said tone level approximating means from the decision results of said mode deciding means, at first, a dynamic range is derived from the maximum and minimum values of the picture element values in said average value separated blocks, the picture element values in said average value separated blocks are normalized in accordance with said dynamic range, one kind of non-linear quantized feature is selected from a plurality of previously prepared non-linear quantized features in accordance with the second feature amount in said tone level direction obtained by said analyzing means, said normalized picture element values in said average value separated blocks are quantized by the number of tone levels decided by said mode deciding means and at the same time the maximum and minimum values of the picture element values in said average value separated blocks are quantized by a given feature, and said quantized values are multiplexed into said coded data.

10. An image encoding device as set forth in claim 6 wherein, when picture elements in said average value separated blocks are quantized by said tone level approximating means from the decision results of said mode deciding means, at first, a dynamic range is found from the maximum and minimum values of the picture element values in said average value separated blocks, the picture element values in said average value separated blocks are normalized in accordance with said dynamic range, one kind of non-linear quantized feature is selected from a plurality of previously prepared non-linear quantized features in accordance with the second feature amount in said tone level direction obtained by said analyzing means, said normalized picture element values in said average value separated blocks are quantized by the number of tone levels decided by said mode deciding means and at the same time the maximum and minimum values of the picture element values in said average value separated blocks are quantized by a given feature, and said quantized values are multiplexed into said coded data.

11. An image encoding device as set forth in claim 7 wherein, when picture elements in said average value separated blocks are quantized by said tone level approximating means from the decision results of said mode deciding means, at first, a dynamic range is found from the average value separated blocks, the picture element values in said average value separated blocks are normalized in accordance with said dynamic range, one kind of non-linear quantized feature is selected from a plurality of previously prepared non-linear quantized features in accordance with the second feature amount in said tone level direction obtained by said analyzing means, said normalized picture element values in said average value separated blocks are quantized by the number of tone levels decided by said mode deciding means and at the same time the maximum and minimum values of the picture element values in said average value separated blocks are quantized by a given feature, and said quantized values are multiplexed to said coded data.

12. An image encoding device comprising:

first resolution changing means for sampling images and changing the resolutions of said images from a lower resolution toward a higher resolution sequentially into a predetermined resolution;

blocking means for dividing the images supplied from said first resolution changing means into blocks each including m × n picture elements where m and n are positive integers;

first block encoding means for encoding said blocked images by said blocking means;

first locally decoding means for locally decoding said blocked images encoded by said first block encoding means;

second block encoding means for encoding said locally decoded blocked images decoded by said first locally decoding means in blocks as large as those in said first block encoding means or in blocks set so as to have a ratio of integer thereto in synchronization with the encoding operation of said first block encoding means;

memory means for storing said encoded locally decoded blocked images in a unit of images which have been converted sequentially into those of given resolutions;

second locally decoding means for decoding said encoded locally decoded blocked images stored in said memory means;

second resolution changing means for changing the resolutions of the encoded locally decoded blocked images supplied from said second locally decoding means into the resolutions that correspond to the resolutions of said first resolution changing means; and subtracting means interposed between said first resolution changing means and said blocking means for subtracting said encoded locally decoded blocked images converted by said second resolution changing means from said images changed in resolution by said first resolution changing means.

13. An image encoding device as set forth in claim 12 wherein said first and second blocking means each comprises:

blocking means for sampling images and dividing each of the images into input blocks each including m × n picture elements where m and n are positive integers;

average value calculating means for obtaining an average value in said input blocks;

average value separating means for subtracting said average value obtained by said average value calculating means from each of picture elements in said input blocks;

analyzing means for analyzing feature amounts, in resolution direction and a tone level direction, of average value separated blocks obtained by said average value separating means;

mode deciding means, in accordance with the results obtained by said analyzing means, for deciding a picture element sub-sampling shape and a picture element sub-sampling ratio in a preset number of said average value separated blocks and the number of tone levels of images in said average value separated blocks independently of one another, resolution truncation means for sub-sampling a picture element in said average value separated blocks in accordance with the picture element sub-sampling shape and picture element sub-sampling ratio decided by said mode deciding means, tone level truncation means for quantizing the picture elements in said average value separated blocks thinned out by said resolution approximating means by means of the number of tone levels decided by said mode deciding means; and multiplexing means for multiplexing said average value from said average value calculating means, the decision result of said mode deciding means and the output of said tone level approximating means to thereby provide coded data.

* * * * *

UNITED STATES PATENT AND TRADEMARK OFFICE
CERTIFICATE OF CORRECTION

PATENT NO. : 5,414,527
DATED : May 09, 1995
INVENTOR(S) : Yutaka KOSHI et al

It is certified that error appears in the above-indentified patent and that said Letters Patent is hereby corrected as shown below:

Claim 1, Column 23, Line 50, after "means" insert --;--.

Claim 5, Column 25, Line 10, before "separated blocks" insert --of each of said picture element values within said average value--.

Signed and Sealed this

Fifth Day of September, 1995

BRUCE LEHMAN

Attest:

Attesting Officer

Commissioner of Patents and Trademarks